(12) United States Patent
Kindig et al.

(10) Patent No.: US 10,657,168 B2
(45) Date of Patent: May 19, 2020

(54) METHODS AND SYSTEMS FOR PERSONALIZED RENDERING OF DIGITAL MEDIA CONTENT

(71) Applicant: Slacker, Inc., San Diego, CA (US)

(72) Inventors: Bradley D. Kindig, San Diego, CA (US); Celite Milbrandt, Austin, TX (US)

(73) Assignee: Slacker, Inc., San Diego, CA (US)

( * ) Notice: Subject to any disclaimer, the term of this patent is extended or adjusted under 35 U.S.C. 154(b) by 44 days.

(21) Appl. No.: 14/709,318

(22) Filed: May 11, 2015

(65) Prior Publication Data

US 2016/0335258 A1    Nov. 17, 2016

Related U.S. Application Data

(63) Continuation of application No. 11/923,573, filed on Oct. 24, 2007, now abandoned.

(60) Provisional application No. 60/862,736, filed on Oct. 24, 2006, provisional application No. 60/886,283, filed on Jan. 23, 2007.

(51) Int. Cl.
   *G06F 16/30*     (2019.01)
   *G06F 7/00*      (2006.01)
   *G06F 16/438*    (2019.01)

(52) U.S. Cl.
   CPC ................. *G06F 16/4387* (2019.01)

(58) Field of Classification Search
   CPC ........ G06F 17/30053; G06F 17/4387
   USPC ............................................. 707/733
   See application file for complete search history.

(56) References Cited

U.S. PATENT DOCUMENTS

| 4,881,078 A | 11/1989 | Toshinobu et al. |
| 4,914,448 A | 4/1990 | Ostsuka et al. |
| 5,038,211 A | 8/1991 | Hallenbeck |
| 5,117,407 A | 5/1992 | Vogel |
| 5,311,175 A | 5/1994 | Waldman |
| 5,323,267 A | 6/1994 | Galarneau et al. |
| 5,666,113 A | 9/1997 | Logan |
| 5,923,267 A | 7/1999 | Beuk et al. |
| 5,977,964 A | 11/1999 | Williams et al. |

(Continued)

FOREIGN PATENT DOCUMENTS

| EP | 0406845 B1 | 1/1994 |
| EP | 1610145 A1 | 12/2005 |

(Continued)

OTHER PUBLICATIONS

Office Action for U.S. Appl. No. 12/582,675, dated Jul. 13, 2018, 16 pages.

(Continued)

*Primary Examiner* — Kuen S Lu
(74) *Attorney, Agent, or Firm* — Cooley LLP

(57) ABSTRACT

Systems and methods are disclosed for providing devices capable of the reception and playback of one or more crafted media channels transmitted over an intermittent connection. The one or more channels may be customized by the end user to bias the programming towards individual tastes or moods. The channels may be delivered over an intermittent, unidirectional link, for example a Satellite Radio receiver in a home or car. Content may also be delivered over an intermittent, bidirectional link, for example to a portable media player via a wireless 802.11 or other networked connection.

14 Claims, 27 Drawing Sheets

(56) References Cited

U.S. PATENT DOCUMENTS

| | | |
|---|---|---|
| 6,004,135 A | 12/1999 | Trattner et al. |
| 6,023,242 A | 2/2000 | Dixon |
| 6,049,306 A | 4/2000 | Amarillas |
| 6,317,784 B1 | 11/2001 | Mackintosh et al. |
| 6,349,339 B1 | 2/2002 | Williams |
| 6,351,596 B1 | 2/2002 | Ostrover |
| 6,388,345 B1 | 5/2002 | Stimpson |
| 6,389,321 B2 | 5/2002 | Tang et al. |
| 6,437,774 B1 | 8/2002 | Tsuji et al. |
| 6,553,222 B1 | 4/2003 | Weiss |
| 6,563,805 B1 | 5/2003 | Ma et al. |
| 6,564,003 B2 | 5/2003 | Marko et al. |
| 6,587,127 B1 | 7/2003 | Leeke et al. |
| 6,658,062 B1 | 12/2003 | Nakatsuyama et al. |
| 6,680,677 B1 | 1/2004 | Tiphane |
| 6,778,841 B1 | 8/2004 | Buries et al. |
| 6,785,656 B2 | 8/2004 | Patsiokas et al. |
| 6,795,702 B2 | 9/2004 | Sennett |
| 6,822,635 B2 | 11/2004 | Shahoian et al. |
| 6,834,156 B1 | 12/2004 | Marko et al. |
| 6,876,835 B1 | 4/2005 | Marko et al. |
| 6,904,055 B2 | 6/2005 | Pichna et al. |
| 6,933,433 B1 | 8/2005 | Porteus et al. |
| 6,934,917 B2 | 8/2005 | Lin |
| 6,972,363 B2 | 12/2005 | Georges et al. |
| 6,985,694 B1 | 1/2006 | De Bonet et al. |
| 7,010,263 B1 | 3/2006 | Patsiokas et al. |
| 7,028,082 B1 | 4/2006 | Rosenberg et al. |
| 7,035,932 B1 | 4/2006 | Dowling |
| 7,057,521 B1 | 6/2006 | Beuk et al. |
| 7,106,221 B2 | 11/2006 | Horton et al. |
| 7,232,973 B2 | 1/2007 | Kaps et al. |
| 7,187,947 B1 | 3/2007 | White et al. |
| 7,216,008 B2 | 5/2007 | Sakata |
| 7,251,452 B2 | 7/2007 | Stumphauzer, II |
| 7,293,066 B1 | 11/2007 | Day |
| 7,352,331 B2 | 4/2008 | Quagliaro |
| 7,403,910 B1 | 7/2008 | Hastings et al. |
| 7,526,728 B2 | 4/2009 | Apparao et al. |
| 7,555,539 B1 | 6/2009 | Rosenberg et al. |
| 7,483,964 B1 | 10/2009 | Jackson et al. |
| 7,624,337 B2 | 11/2009 | Sull et al. |
| 7,680,959 B2 | 3/2010 | Svendsen |
| 7,756,388 B2 | 7/2010 | Plastina et al. |
| 7,840,563 B2 | 11/2010 | Powers et al. |
| 7,877,290 B1 | 1/2011 | Arsenault et al. |
| 7,884,274 B1 | 2/2011 | Wieder |
| 7,890,874 B2 | 2/2011 | Kaufman |
| 7,953,032 B2 | 5/2011 | Liang |
| 8,050,652 B2 | 11/2011 | Qureshey et al. |
| 8,204,073 B1 | 6/2012 | Gailloux et al. |
| 8,332,512 B1 | 12/2012 | Wu et al. |
| 8,370,351 B2 | 2/2013 | Kalasapur et al. |
| 8,443,007 B1 | 5/2013 | Kindig et al. |
| 8,712,563 B2 | 4/2014 | Milbrandt et al. |
| 8,737,910 B2 | 5/2014 | Zigler et al. |
| 8,838,564 B2 | 9/2014 | Sahni et al. |
| 8,849,820 B1 | 9/2014 | Kindig et al. |
| 8,881,209 B2 | 11/2014 | Kalmes et al. |
| 2001/0005900 A1 | 6/2001 | Yoshida et al. |
| 2001/0053944 A1 | 12/2001 | Marks et al. |
| 2002/0016643 A1 | 2/2002 | Sakata |
| 2002/0041692 A1 | 4/2002 | Seto et al. |
| 2002/0072341 A1 | 6/2002 | Ricard et al. |
| 2002/0073225 A1 | 6/2002 | Dillon et al. |
| 2002/0082901 A1 | 6/2002 | Dunning et al. |
| 2002/0092019 A1 | 7/2002 | Marcus |
| 2002/0158838 A1 | 10/2002 | Smith et al. |
| 2002/0164973 A1 | 11/2002 | Janik et al. |
| 2002/0184111 A1 | 12/2002 | Swanson |
| 2002/0199194 A1 | 12/2002 | Ali |
| 2003/0006690 A1 | 1/2003 | Roh |
| 2003/0006892 A1 | 1/2003 | Church |
| 2003/0014496 A1 | 1/2003 | Spencer et al. |
| 2003/0027523 A1 | 2/2003 | Lim |
| 2003/0050997 A1 | 3/2003 | Hickey et al. |
| 2003/0052913 A1 | 3/2003 | Barile |
| 2003/0061611 A1 | 3/2003 | Pendakur |
| 2003/0066090 A1* | 4/2003 | Traw .................. H04N 21/235 725/114 |
| 2003/0073411 A1 | 4/2003 | Meade |
| 2003/0089218 A1 | 5/2003 | Gang et al. |
| 2003/0110503 A1* | 6/2003 | Perkes ............... H04N 7/17318 725/86 |
| 2003/0122779 A1 | 7/2003 | Martin et al. |
| 2003/0182255 A1 | 9/2003 | Plastina et al. |
| 2004/0001690 A1 | 1/2004 | Boston et al. |
| 2004/0017316 A1 | 1/2004 | Tanaka et al. |
| 2004/0044677 A1 | 3/2004 | Huper-Graff et al. |
| 2004/0064476 A1 | 4/2004 | Rounds |
| 2004/0158860 A1 | 8/2004 | Crow |
| 2004/0218067 A1 | 11/2004 | Chen et al. |
| 2004/0220926 A1 | 11/2004 | Lamkin et al. |
| 2004/0267503 A1 | 12/2004 | Batterberry et al. |
| 2005/0108754 A1 | 5/2005 | Carhart et al. |
| 2005/0114794 A1 | 5/2005 | Grimes et al. |
| 2005/0120305 A1 | 6/2005 | Engstrom et al. |
| 2005/0172318 A1 | 8/2005 | Dudkiewicz et al. |
| 2005/0179668 A1 | 8/2005 | Edwards |
| 2005/0198690 A1 | 9/2005 | Esolen et al. |
| 2005/0240661 A1 | 10/2005 | Heller et al. |
| 2006/0005148 A1 | 1/2006 | Cheng et al. |
| 2006/0009199 A1 | 1/2006 | Mittal |
| 2006/0123053 A1 | 1/2006 | Scannell, Jr. |
| 2006/0022960 A1 | 2/2006 | Fukushima |
| 2006/0026663 A1 | 2/2006 | Kortum et al. |
| 2006/0031892 A1 | 2/2006 | Cohen |
| 2006/0075007 A1 | 4/2006 | Anderson et al. |
| 2006/0085349 A1 | 4/2006 | Hug |
| 2006/0112082 A1 | 5/2006 | Platt et al. |
| 2006/0126750 A1 | 6/2006 | Friedman |
| 2006/0143094 A1 | 6/2006 | Kohout et al. |
| 2006/0149813 A1 | 7/2006 | Janik |
| 2006/0156236 A1 | 7/2006 | Heller et al. |
| 2006/0174313 A1 | 8/2006 | Ducheneaut et al. |
| 2006/0194535 A1 | 8/2006 | Houldsworth et al. |
| 2006/0195516 A1 | 8/2006 | Beaupre |
| 2006/0195790 A1 | 8/2006 | Beaupre et al. |
| 2006/0200599 A1 | 9/2006 | Manchester et al. |
| 2006/0206478 A1 | 9/2006 | Glaser et al. |
| 2006/0206493 A1 | 9/2006 | Lipscomb et al. |
| 2006/0212442 A1 | 9/2006 | Conrad et al. |
| 2006/0212444 A1 | 9/2006 | Handman et al. |
| 2006/0218187 A1 | 9/2006 | Plastina et al. |
| 2006/0227905 A1 | 10/2006 | Kunysz et al. |
| 2006/0235864 A1 | 10/2006 | Hotelling et al. |
| 2006/0238517 A1 | 10/2006 | King et al. |
| 2006/0239131 A1 | 10/2006 | Nathan et al. |
| 2006/0242106 A1 | 10/2006 | Bank |
| 2006/0253782 A1 | 11/2006 | Stark et al. |
| 2006/0265329 A1 | 11/2006 | Hug |
| 2006/0265421 A1 | 11/2006 | Ranasinghe et al. |
| 2007/0013593 A1 | 1/2007 | Zafar et al. |
| 2007/0041350 A1 | 2/2007 | Famolari |
| 2007/0073728 A1 | 3/2007 | Klein et al. |
| 2007/0078899 A1 | 4/2007 | Gulin et al. |
| 2007/0079352 A1 | 4/2007 | Klein, Jr. |
| 2007/0089057 A1 | 4/2007 | Kindig |
| 2007/0136753 A1 | 6/2007 | Bovenschulte et al. |
| 2007/0152975 A1 | 7/2007 | Ogihara et al. |
| 2007/0152977 A1 | 7/2007 | Ng et al. |
| 2007/0156589 A1 | 7/2007 | Zimler et al. |
| 2007/0174147 A1 | 7/2007 | Klein, Jr. |
| 2007/0208610 A1 | 9/2007 | Pisaris-Henderson et al. |
| 2007/0220552 A1 | 9/2007 | Juster et al. |
| 2007/0236472 A1 | 10/2007 | Bentsen et al. |
| 2007/0239856 A1 | 10/2007 | Abadir |
| 2007/0281704 A1 | 12/2007 | Lin et al. |
| 2007/0300158 A1 | 12/2007 | Kasperkiewicz et al. |
| 2008/0009268 A1 | 1/2008 | Ramer et al. |
| 2008/0024958 A1 | 1/2008 | Mudd et al. |
| 2008/0052630 A1 | 2/2008 | Rosenbaum et al. |
| 2008/0086379 A1 | 4/2008 | Dion et al. |
| 2008/0097967 A1 | 4/2008 | Milbrandt et al. |

(56) References Cited

U.S. PATENT DOCUMENTS

| | | | |
|---|---|---|---|
| 2008/0120648 | A1 | 5/2008 | Carlson et al. |
| 2008/0162570 | A1 | 7/2008 | Kindig et al. |
| 2008/0215645 | A1 | 9/2008 | Kindig et al. |
| 2008/0222546 | A1 | 9/2008 | Mudd et al. |
| 2008/0222576 | A1 | 9/2008 | Hashimoto |
| 2008/0242277 | A1 | 10/2008 | Chen et al. |
| 2008/0258986 | A1 | 10/2008 | Milbrandt et al. |
| 2008/0261512 | A1 | 10/2008 | Milbrandt et al. |
| 2008/0263098 | A1 | 10/2008 | Kindig et al. |
| 2008/0305736 | A1 | 12/2008 | Milbrandt et al. |
| 2009/0017866 | A1 | 1/2009 | White et al. |
| 2009/0019374 | A1 | 1/2009 | Logan et al. |
| 2009/0031007 | A1 | 1/2009 | Boic et al. |
| 2009/0147975 | A1 | 6/2009 | Horbach et al. |
| 2009/0164419 | A1 | 6/2009 | Taylor et al. |
| 2010/0010648 | A1 | 1/2010 | Bull et al. |
| 2010/0106852 | A1 | 4/2010 | Kindig et al. |
| 2010/0121857 | A1 | 5/2010 | Elmore et al. |
| 2010/0125507 | A1 | 5/2010 | Tarantino et al. |
| 2011/0107381 | A1 | 5/2011 | Solnik et al. |
| 2013/0014136 | A1* | 1/2013 | Bhatia ............... H04N 21/252 |
| | | | 725/9 |
| 2013/0086078 | A1 | 4/2013 | Malleshaiah |
| 2013/0218942 | A1 | 8/2013 | Willis et al. |
| 2013/0262966 | A1 | 10/2013 | Wu et al. |
| 2013/0318080 | A1 | 11/2013 | Aravamudan et al. |
| 2014/0006556 | A1* | 1/2014 | Shapiro ............ H04N 21/25891 |
| | | | 709/217 |
| 2014/0177717 | A1 | 6/2014 | Li et al. |
| 2014/0258025 | A1 | 9/2014 | Bouzid et al. |
| 2014/0258313 | A1 | 9/2014 | McCallum |
| 2014/0280213 | A1 | 9/2014 | Isquith et al. |
| 2015/0006544 | A1 | 1/2015 | Isquith et al. |
| 2017/0126770 | A1 | 5/2017 | Kindig |
| 2017/0195728 | A1 | 7/2017 | Mudd et al. |

FOREIGN PATENT DOCUMENTS

| | | |
|---|---|---|
| GB | 2343053 A | 4/2000 |
| KR | 10-2011-0073484 A | 6/2011 |
| WO | WO 1999/012230 A1 | 3/1999 |
| WO | WO 2001/035667 A1 | 5/2001 |
| WO | WO 2004/097803 A2 | 11/2004 |
| WO | WO 2005/034407 A2 | 4/2005 |
| WO | WO 2005/076117 A1 | 8/2005 |
| WO | WO 2006/042309 A1 | 4/2006 |
| WO | WO 2006/124277 A | 11/2006 |
| WO | WO 2008/060032 A1 | 5/2008 |

OTHER PUBLICATIONS

Office Action for Canadian Application No. 2,680,281 dated Feb. 8, 2018, 2 pages.
Office Action for U.S. Appl. No. 14/550,804, dated Jan. 25, 2018, 30 pages.
Carlvik, O. et al., "IP-Based Personalized Media on Demand," ISS '97, World Telecommunications Congress, (International Switching Symposium); Global Network Evolution: Convergence or Collision? Toronto, Sep. 21-26, 1997, pp. 365-370.
Hacker, S., "MP3: The Devinitive Guide," Mar. 1, 2000, O'Reilly Media, Inc., p. 112, ISBN: 978-1-565-92661-5.
Motorola, "Complexity analysis of the Motorola Turbo Code Interleaver," TSG-RAN Working Group 1 Meeting #3, Eskilstuna, Sweden, Mar. 22-26, 1999, pp. 1-5.
Tell, E. et al., "A hardware architecture for a multi mode block interleaver," Proc. ICCSC [Online], Jul. 2004, Moscow Russia, Retrieved from the Internet: <URL: http://www.da.isy.liu.se/pubs/erite/>, [Retrieved on Aug. 14, 2008], pp. 1-4.
Wikipedia, "Pandora Radio," Oct. 7, 2006, [Online], Retrieved from the Internet on: Oct. 12, 2010, <URL: http://en.wikipedia.org/w/index.php?title=Pandora_Radio&oldid=80072157>, 3 pages.
Pandora, "Frequently Asked Questions", Aug. 30, 2006, Pandora Media Inc., Retrieved from the Internet: <URL: web.archive.org/web/20060830160154/http://blog.pandora.com/faq/>, pp. 1-14.
U.S. Appl. No. 11/774,481, Office Action dated Apr. 29, 2010.
PCT/US2007/072954, International Search Report dated Feb. 1, 2008.
PCT/US2007/072954, Written Opinion dated Feb. 1, 2008.
PCT/US2007/072954, International Preliminary Report on Patentability dated Jan. 6, 2009.
Office Action for Canadian Application No. 2,667,573 dated Jun. 13, 2014, 3 pages.
Office Action for Canadian Application No. 2,667,573, dated Jul. 8, 2015, 4 pages.
Office Action for Canadian Application No. 2,667,573, dated Jun. 14, 2016, 2 pages.
Supplementary European Search Report for European Application No. 07868561.7, dated Jan. 2, 2012, 7 pages.
PCT/US2007/082373, International Search Report dated Sep. 22, 2008.
PCT/US2007/082373, Written Opinion dated Sep. 22, 2008.
PCT/US2007/082373, International Preliminary Report on Patentability dated Apr. 28, 2009.
U.S. Appl. No. 12/582,675, Office Action dated Nov. 23, 2012,13 pages.
U.S. Appl. No. 12/582,675, Office Action dated Oct. 3, 2014, 11 pages.
Office Action for U.S. Appl. No. 12/582,675, dated Mar. 25, 2016, 16 pages.
Office Action for U.S. Appl. No. 12/582,675, dated Aug. 24, 2017, 17 pages.
Office Action for U.S. Appl. No. 12/582,675, dated Jan. 18, 2017, 15 pages.
Office Action for U.S. Appl. No. 12/582,675, dated Jul. 17, 2015, 13 pages.
Office Action for U.S. Appl. No. 12/582,675, dated Aug. 9, 2013, 11 pages.
U.S. Appl. No. 13/106,754, Office Action dated Jul. 3, 2012.
U.S. Appl. No. 12/011,193, Office Action dated Nov. 10, 2010.
U.S. Appl. No. 12/011,193, Office Action dated Jul. 22, 2011.
U.S. Appl. No. 12/011,193, Office Action dated Nov. 16, 2011.
U.S. Appl. No. 12/011,193, Office Action dated Oct. 2, 2013.
U.S. Appl. No. 12/011,193, Office Action dated Aug. 4, 2014.
Canadian Office Action in Application No. CA 2,680,281 dated Jan. 23, 2015.
Office Action for Canadian Application 2,680,281 dated Feb. 8, 2017, 3 pages.
European Office Action in Application No. EP 08754882.2, dated Feb. 11, 2010.
U.S. Appl. No. 12/045,666, Office Action dated Oct. 6, 2011.
U.S. Appl. No. 12/045,666, Office Action dated Jun. 4, 2012.
U.S. Appl. No. 12/045,666, Office Action dated Jul. 19, 2013.
U.S. Appl. No. 12/045,666, Office Action dated May 21, 2014.
PCT/US2008/056451, International Search Report dated Jun. 24, 2008.
PCT/US2008/056451, Written Opinion dated Jun. 24, 2008.
PCT/US2008/056451, International Preliminary Report on Patentability dated Sep. 8, 2009.
Office Action for U.S. Appl. No. 14/550,804, dated Jun. 29, 2017, 29 pages.
U.S. Appl. No. 12/032,637, Office Action dated Mar. 21, 2011.
PCT/US2006/054184, International Search Report & Written Opinion dated Jul. 2, 2008.
PCT/US2006/054184, International Preliminary Report on Patentability dated Aug. 19, 2009.
U.S. Appl. No. 12/039,692, Office Action dated Nov. 24, 2010.
PCT/US2006/055390, International Search Report dated Aug. 22, 2008.
PCT/US2006/055390, Written Opinion dated Aug. 22, 2008.
PCT/US2006/055390, International Preliminary Report on Patentability dated Sep. 1, 2009.
PCT/US2006/055197, International Search Report dated Aug. 29, 2008.

(56) References Cited

OTHER PUBLICATIONS

Written Opinion for International Application No. PCT/US2008/055197, dated Aug. 29, 2008, 5 pages.
PCT/US2008/055197, International Preliminary Report on Patentability dated Sep. 1, 2009.
Office Action for Canadian Application No. 2,680,797, dated Jan. 26, 2015, 5 pages.
Office Action for Canadian Application No. 2,680,797, dated Jul. 28, 2016, 4 pages.
U.S. Appl. No. 12/048,128, Office Action dated Dec. 23, 2011.
U.S. Appl. No. 12/048,128, Office Action dated Sep. 13, 2012.
U.S. Appl. No. 12/048,128, Office Action dated Mar. 26, 2015.
Office Action for U.S. Appl. No. 12/048,128, dated Feb. 4, 2016, 23 pages.
PCT/US2008/056899, International Search Report dated Mar. 27, 2009.
PCT/US2008/056899, Written Opinion dated Mar. 27, 2009.
PCT/US2008/056899, International Preliminary Report on Patentability dated Sep. 15, 2009.
European Office Action in Application No. EP 07869177.1, dated Mar. 13, 2015.
Canadian Office Action in Application No. CA 2,672,437 dated Oct. 14, 2014.
U.S. Appl. No. 11/637,300, Office Action dated Sep. 30, 2008.
U.S. Appl. No. 11/955,299, Office Action dated Oct. 18, 2011.
U.S. Appl. No. 11/955,299, Office Action dated Feb. 22, 2012.
PCT/US2007/087305, International Search Report and Written Opinion dated Jul. 3, 2008.
PCT/US2007/087305, International Preliminary Report on Patentability dated Jun. 16, 2009.
U.S. Appl. No. 12/049,113, Office Action dated Jan. 25, 2011.
PCT/US2008/057110, International Search Report and Written Opinion dated Aug. 5, 2008.
PCT/US2008/057110, International Preliminary Report on Patentability dated Sep. 15, 2009.
Office Action for U.S. Appl. No. 14/216,877, dated Sep. 30, 2016, 21 pages.
Office Action for U.S. Appl. No. 13/838,244, dated Feb. 9, 2015, 15 pages.
Office Action for U.S. Appl. No. 13/838,244, dated Apr. 22, 2016, 33 pages.
Office Action for U.S. Appl. No. 13/838,244, dated Nov. 30, 2016, 24 pages.
Office Action for U.S. Appl. No. 13/838,244, dated Sep. 29, 2015, 28 pages.
PCT/US2014/030837, International Search Report dated Jul. 24, 2014.
U.S. Appl. No. 11/923,554, Office Action dated Dec. 23, 2009.
U.S. Appl. No. 11/923,554, Office Action dated Nov. 12, 2010.
U.S. Appl. No. 11/923,573, Office Action dated Jun. 22, 2011.
U.S. Appl. No. 11/923,573, Office Action dated Oct. 14, 2010.

\* cited by examiner

Example Age scoring for an 80's station: Min=1980, Median=1985, Max=1989

Age scoring for a 'Classic Rock' station: Min=1960, Median=1977, Max=1995

Age scoring for an 'Alternative' Station: Min=1975, Median=2000, Max=2006

Sequence score as a function of track rest.
Target Rest is 300, Minimum Rest is 150. Noise floor is .0125.

An Exemplary Allocation of Inventory Pools

Duty Cycle Adaptation

Inventory Management Symbols and Descriptions in Accordance with One Embodiment

| Name | Symbol | Description | Default Value |
|---|---|---|---|
| Total Service Tracks | $T_{total}$ | Total number of tracks currently allocated to the services pool. | Number of tracks initially loaded onto the device: 1000 – 5000. |
| Minimum Station Tracks | $T_{s\,min}$ | Minimum tracks for an inactive station that renders the station reasonable should the user switch to that station | 25 |
| Maximum Station Tracks | $T_{s\,max}$ | Maximum tracks for an active station. Diminishing returns by caching more tracks than this for a single station. Caps the tracks on an active station causing excess tracks to be redistributed to less active or inactive stations. | HUGE (not used)? |
| Minimum Service Active Pool | $A_{min}$ | Minimum number of tracks to allocate amongst the active stations according to predicted duty cycle. Similar to Tsmax in that a station with 100% duty cycle gets this many tracks. Used to define the minimum pool size for the service: Amax + (Tsmin * inactive stations) | 500 |
| Minimum Service Tracks | $T_{min}$ | Minimum number of tracks needed to operate the service. This can be reduced only by deleting inactive stations. | $A_{min}$ + ($T_{s\,min}$ * inactive stations) |
| Average Track Size (bytes) | $t_{size}$ | Average size of a services track in bytes. | ~1MB |
| High Water | $W_{hi}$ | Threshold of nearing device full that triggers an inventory cull cycle to free space | Initial Services Allocation – (N * $t_{size}$) N =~ 10? |
| Low Water | $W_{low}$ | Defines the target amount of space to be free after an inventory management cycle. Setting this farther below $W_{hi}$ results in fewer inventory cull operations, but less efficient use of space. | $W_{hi}$ - $W_{delta}$ |
| Water Delta | $W_{delta}$ | Fixed constant defining difference between high and low water. A smaller setting results in more frequent Inventory Cull cycles. A larger setting results in fewer usable tracks on average. | 20 * $t_{size}$ |
| Float | $T_{float}$ | Number of tracks currently above $W_{low}$ | |
| Device full warning threshold | $T_{warn}$ | Number of tracks away from device full to trigger warning messages for device nearly full. | 10? |

FIG. 27

METHODS AND SYSTEMS FOR PERSONALIZED RENDERING OF DIGITAL MEDIA CONTENT

CROSS-REFERENCE TO RELATED APPLICATIONS

This application is a continuation of U.S. application Ser. No. 11/923,573, entitled METHODS AND SYSTEMS FOR PERSONALIZED RENDERING OF DIGITAL MEDIA CONTENT, filed on Oct. 24, 2007, which claims the benefit of priority under 35 U.S.C. § 119(e) to co-pending U.S. Provisional Patent Application Ser. No. 60/867,763, entitled "Method and Device for Playback of Locally-Stored Digital Media Content," filed on Oct. 24, 2006, and to co-pending U.S. Provisional Patent Application Ser. No. 60/886,283, entitled "Devices and Methods for Distributing Digital Content," filed on Jan. 23, 2007. This application is also related to U.S. patent application Ser. No. 11/637,300, entitled "Method and Apparatus for Distribution of Digital Content," filed on Dec. 12, 2006. The contents of each of these applications is hereby incorporated by reference herein for all purposes.

FIELD OF THE INVENTION

This invention relates generally to methods, systems, and devices for receiving, storing and playing back digital media files and, more particularly, to methods, systems, and devices capable of acquiring digital media files over wired and wireless communications links that may be intermittently connected and potentially subject to noise, interference, or other forms of connectivity disruption.

BACKGROUND

Traditional AM, FM, television, and satellite radio receivers are configured to receive real-time broadcasts: i.e., the broadcast is rendered for playback contiguously with the reception of the signal. With the introduction of recording capabilities such as audio tape decks and VCRs, users were enabled to record broadcast content and play it back at their leisure.

More recently, the introduction of recording devices such as digital video recorders (DVRs) allows consumers to more conveniently "time shift" programming. These devices allow simultaneous recording and playback, thus enabling features such as the simulation of pausing, rewinding, or fast-forwarding of live television.

Portable media players and media-enabled phones are able to load content from personal computers over wired connections. A few media players and certain phones are able to load content over wireless networks. A few portable media players have connectivity to satellite radio systems. At least one such portable player also allows the user to record and store content from the satellite broadcast as if the device contained an integrated tape deck. Unfortunately, traditional broadcast mediums such as television, radio, and even satellite radio tend to offer minimal opportunities for user customization and interactivity. While the number of channels continues to increase in each of these mediums, the mediums themselves fail to accommodate even simple customizations such as "Classic Rock with extra U2, and no Supertramp."

Moreover, existing portable music players also fail to address the needs of many users that want a professionally programmed listening experience akin to traditional radio, but want their user specific preferences adhered to. With these existing devices, the users must acquire their own content and program their own channels at substantial time, effort, and cost. In addition, existing media players capable of receiving broadcast transmissions, such as satellite radio receivers used in cars and other portable devices, can be frustrating to use in that temporary losses in signal result in interruption of the listening experience.

BRIEF DESCRIPTION OF THE DRAWINGS

For a better understanding of the nature and objects of various embodiments of the invention, reference should be made to the following detailed description taken in conjunction with the accompanying drawings, wherein:

FIG. 27 is a table illustrating inventory management symbols and description based on an embodiment of the present invention.

DETAILED DESCRIPTION OF EMBODIMENTS OF THE INVENTION

Introduction

Figure 1:
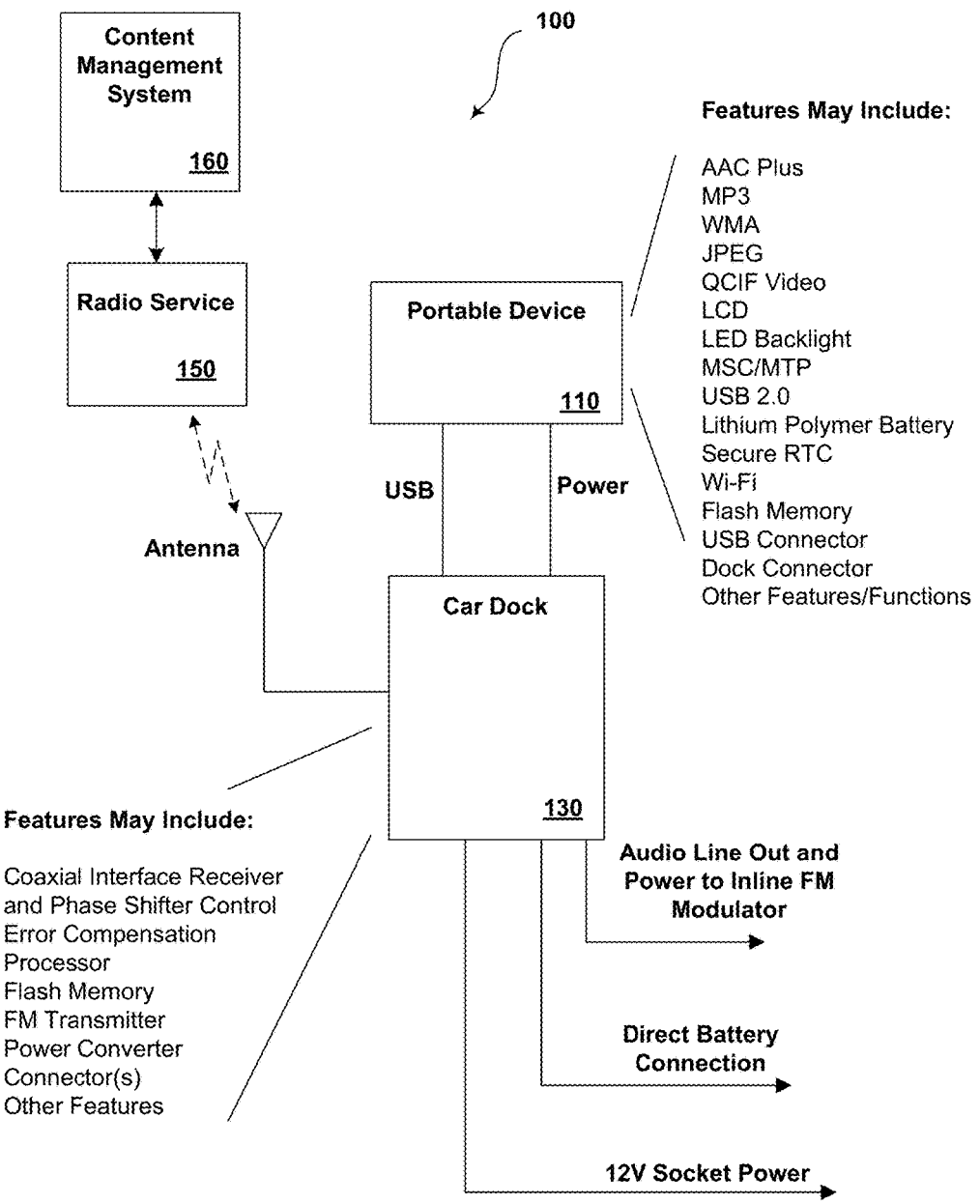
FIG. 1 illustrates an embodiment of a portable device and associated system in a mobile application in accordance with aspects of the present invention.

Embodiments of a digital media content reception and playback device that overcomes many of the shortcomings described previously, as well as others, is disclosed herein. In one or more embodiments, the digital media content reception and playback device (hereinafter also denoted for brevity as a "device" or a "player") is capable of receiving content over intermittent connections and organizing and sequencing the content into a program that leaves a listener with the impression that traditional programming is being delivered, but which nonetheless accommodates the listener's specific preferences and may be customized and tailored dynamically to user preferences. Content may be created, managed, and provided by a content management system including one or more servers configured to receive user information as well as content and content requests, store content, manage content, customize content, distribute content via wired or wireless channels, and provide other related management and distribution functions. Such a content management system and any associated servers or other components is also described herein simply as the "server" for purposes of brevity.

In one embodiment, the device leverages the expertise of professional content programmers that acquire and filter a broad base of relevant content and define the rules that determine the mix and sequencing of content to be played on the device. Thus, the user is freed from the difficult task of acquiring content and creating playlists.

In typical embodiments the device will be configured to filter incoming content for transmission errors and discard content that contains artifacts that would be perceived by the user. Thus the ability to render pristine content is preserved even when the device is in areas with poor or no reception.

In one or more embodiments the device comprises a personal digital audio player for use in and out of automotive or other mobile environments. While this embodiment is described hereinafter in terms of audio playback, it will be apparent to those skilled in the art that the invention is equally applicable to photos, graphics, images, video or other types of multimedia content.

In some embodiments the device may be configured to dock in an automobile or other vehicle. When the device is docked in an automobile, it may be connected to a satellite antenna that is capable of receiving a unidirectional broadcast of audio content and data.

Additionally, the device may be configured with built-in wired or wireless capabilities using networks such as those based on IEEE standard 802.11, or other local or wide area networks capable of providing connection to wireless networks. Those skilled in the art will readily appreciate that the invention is not constrained to any particular type of network connection or client server configuration.

In some embodiments the device may be configured to dock or otherwise connect with home or office based systems such as personal computers or other devices capable of networking, or with home entertainment or similar systems.

Additional aspects of the invention are also contemplated as further described and illustrated herein.

Operational Overview

Operation with Unidirectional Connectivity

In typical unidirectional embodiments, when the device is operating with a unidirectional connection as it typically is when receiving content over a satellite link, the device receives content that is broadcast on the connection, with content typically originating from a server or servers that are part of a content management system. In accordance with one aspect of the invention, the device compares the content against one or more station profiles and decides whether to keep the content or whether to discard it. In essence, the device decides if the content is of interest to its user, based on a set of user preferences, and stores the content of most interest for playback. One aspect of the present invention relates to systems and methods for implementing decision processes for selecting, storing, and playing content and is described in detail in the sections that follow in relation to Inventory Management.

The process of receiving, analyzing, and caching or discarding content typically takes place independently of device playback. The device will continuously receive and process incoming content so long as it is sufficiently powered and has an operational connection. In typical embodiments, the device is configured to be capable of simultaneously playing back content from the cache while receiving and processing new content into the cache.

Operation with Bidirectional Connection

In typical bidirectional embodiments, when connected to an associated content broadcasting service with a bidirectional connection, the device is configured so that it can transmit its preferences to a content management system so that only content of interest is provided and downloaded to the device. This is done by either fully or partially offloading the Inventory Management function to the server side of the connection (where the device is part of the client side).

In a preferred embodiment, the device transmits its station profiles to the server and receives a prioritized list of content to download. The device downloads the content in priority order. The list is prioritized so as to maximize the improvement to the device's inventory should the connection be lost before all tracks are downloaded.

Playback Operations

In typical embodiments, whether or not connected, the device can play the content in its cache. The cached content may be organized such that the device's algorithms can efficiently generate playlists that approximate the crafted song sequences created by professional radio programmers. Professional radio programmers may be used to support the device population by categorizing the content transmitted to the device into stations and station categories. The radio programmers may also specify the rules used by the device to sequence the content for a given station. This may be done in conjunction with the content management system, with the information being input, stored, processed, and output by one or more servers or other data storage and distribution elements.

The user may then access these sequences on the device by selecting the station by name or preset button, similar to the way a user selects a station on a traditional car stereo or satellite radio receiver. In addition, however, the user may also be provided with options and selections to customize the station and interact with playback order in a way that is not possible using traditional broadcast receivers. Embodiments of these processes are further described and illustrated below.

Playback Features

Because the device may be configured to select the next song for playback independently of the broadcast stream, each device can customize playback order according to the preferences of its owner or user. For example, some of the unique features of the device that are not possible with traditional radio receivers may include:

- Ability to skip content. If the user does not like the current song, they may skip to the next song on the station.
- Ability to replay content. The user may skip backwards to replay songs.
- Ability to pause content. The user may pause the currently playing track.
- Random access to content. The user may seek forward or backward through the content.
- Ability to ban content. If the user does not like a particular song, artist, or other content characteristic (composer, commentator, etc.) they may ban the content from the device. Content matching the banned characteristics will no longer be played on the device.
- Ability to save favorites. If the user hears a song they like, they may save it as a favorite. Favorites can be stored in a special folder or playlist for future access.
- Ability to bias station playback towards certain content. The user may adjust station knobs or "sliders" to bias the track selection towards songs with certain attributes. Examples of station slider controls include (but are not limited to):
  Newer←→Older
  Harder←→Softer
  Popular←→Obscure
  Favorite←→Non-Favorite
- Ability to create user tailored stations. While most stations can be created by professional radio programmers, users that are so inclined can create their own stations using these same tools or variants thereof
- Very large station catalog. While a limited number of stations are supported through the unidirectional channel, users that update their players via bidirectional channels can have access to a very large catalog of stations. Potentially, this catalog can contain stations created by the user community as well as stations created by programming professionals. This can also include content published by Really Simple Syndication (RSS) including audio-blogs or "podcasts."

Other unique features and functions are also contemplated as further described herein.

Physical Architecture

Figure 2:
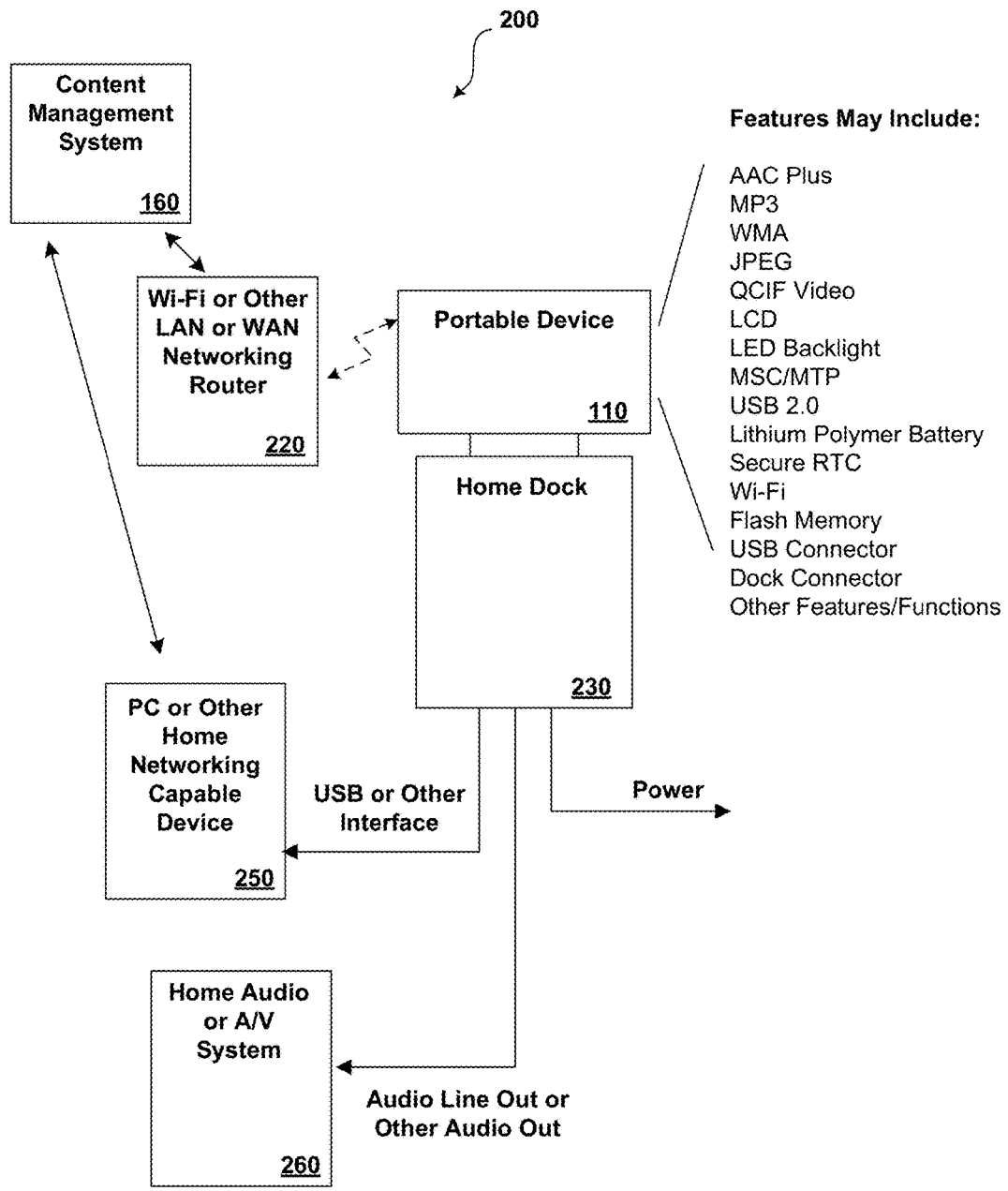
FIG. 2 illustrates an embodiment of a portable device and associated system in a residential or office application in accordance with aspects of the present invention.
Figure 3:
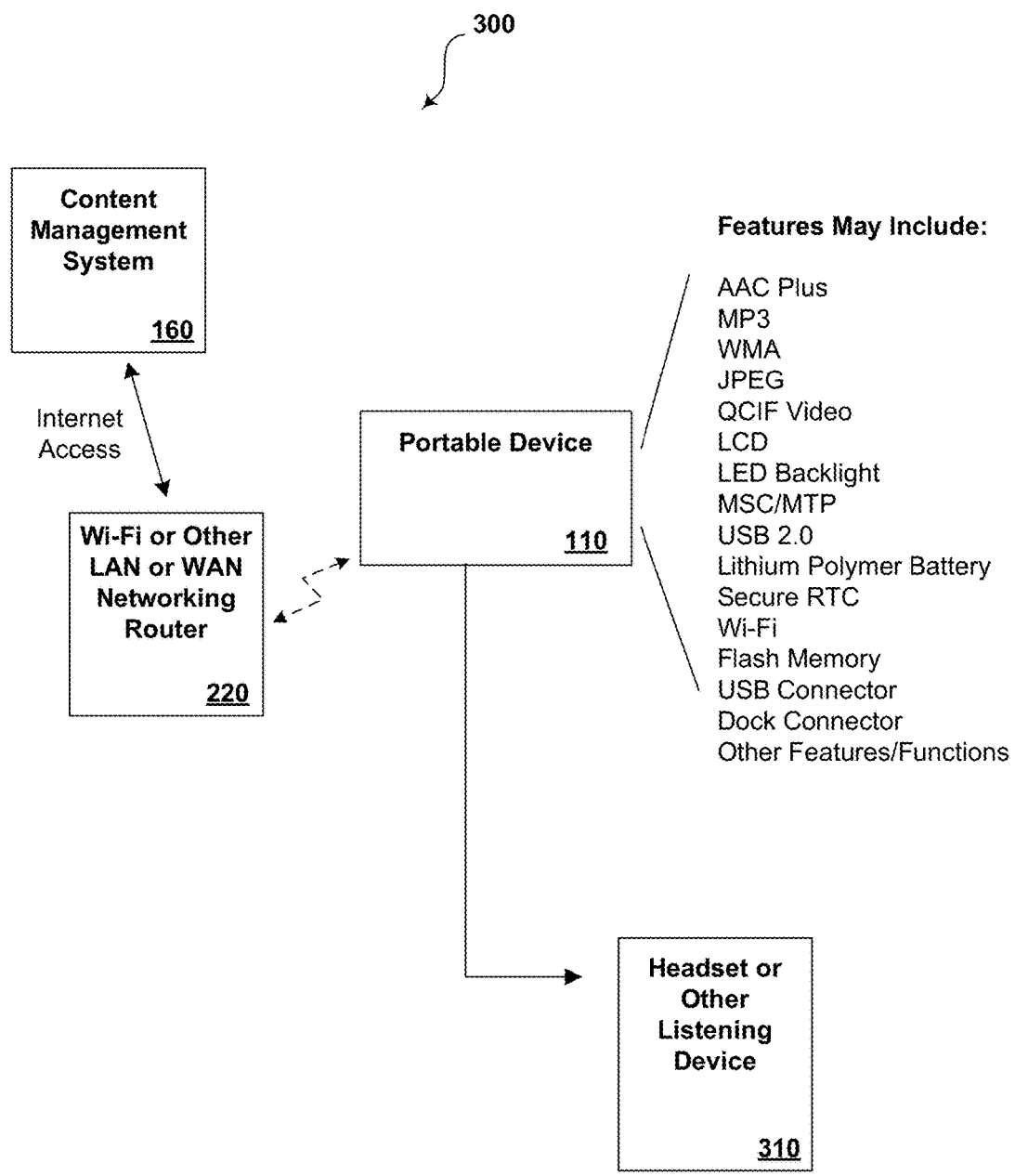
FIG. 3 illustrates an embodiment of a portable device and associated system in a mobile application in accordance with aspects of the present invention.

Attention is now directed to FIGS. 1-3, which depict the physical architecture of embodiments of aspects of the invention in a variety of contexts. Specifically, FIGS. 1 and 2 provide representations of embodiments of systems in accordance with the invention in cases where the digital media playback device is docked within an automobile and in a home location, respectively. For example, as shown in FIG. 1, one embodiment of a system 100 may include a portable device 110 connected to a car dock 130, wherein the car dock 130 may include the capability of receiving and/or sending content to a content management system 160 through a radio service 150. This connection will typically be via a wireless connection using systems based on satellite communication and/or wireless networks such as those based on IEEE 802.11 standards (Wi-Fi) or other local or wide area networking standards. As shown in FIG. 1, the docking may include standard interfaces between the portable device 110 and the dock 130 such as USB, or may be based on proprietary interfaces.

FIG. 2 illustrates one embodiment of a system 200 configured for home, office, or business use of portable device 110. System 200 may include connection through a home dock 230 and/or via other connection methods such as through a home or office networking device 220, a PC 250, home A/V equipment 260, or via other connections configured to send information and receive content from a content management system 160.

FIG. 3 illustrates one embodiment of a system 300 wherein portable device 110 is used as a mobile or portable device in conjunction with a wireless network connection 220, such as a router or other networking device based on IEEE standard 802.11 or other local or wide area networking standards. A typical portable system 300 will include a listening device (headphone, ear buds, etc.) 310 allowing the user to move about and isolate audio content from the environment if desired.

Those skilled in the art will appreciate that it is possible to realize a wide range of additional embodiments of systems in accordance with the invention using a variety of hardware platforms as well as hardware, software, and network configurations.

Software/Firmware Architecture

Aspects of the present invention are related to playback and content management on the device. Before describing embodiments of algorithms used for playback sequencing and inventory management, a set of core objects used in a preferred embodiment are described below and illustrated in FIG. 4. It is noted that the object-oriented architecture described below is not unique and other objects and associated object configurations may also be used in keeping within the spirit and scope of the invention.

PlayerContext—The parent object that implements the overall player behavior.

Station—As described herein, a Station is a content channel analogous to a terrestrial radio station. The user may store one or more favorite stations as 'presets' on the device to optimize their ability to access the channel. The user will have access to the broader catalog of all available Stations through the device. The Station holds the settings/customizations that are used to bias the content cached or played on the station (sliders) as well as the engine used to sequence the Station's content (Clock).

StationProfile—As described herein, a StationProfile is a definition of the rules and settings used to assemble a station. A set of StationProfiles is loaded onto the device. Some settings in the StationProfile may be customized by the device user. Such customization may involve, for example, setting sliders in accordance with user preferences. In one embodiment the station profile includes the current biases (as set by sliders) towards selecting content based on Popularity, Energy (hard/smooth), Favorites, and Age. Providing a setting to control whether or not certain types of content will be permitted to be played enables an alternate form of customization to be effected.

StationProfiles for a core set of stations are typically created and maintained by professional radio programmers. These station profiles may be transmitted on either the bidirectional or unidirectional links to update the profiles in the device from time to time.

Optionally, users may create their own custom station profiles (typically using an application external to the device, such as a web based application, but devices may also be configured to allow users to create simple stations on the device through user interfaces). These profiles would typically be loaded and provisioned through the bidirectional connection. A StationProfile includes the definition of the Clock and the Buckets that comprise the Clock that will be used on the device.

The StationProfile may be thought of as a set of rules or instructions for creating a station or a serialization of the Station and its associated objects. In one embodiment, the StationProfile is an XML document. In an alternative embodiment, the StationProfile is a more compact binary format with a corresponding parsing schema. Other embodiments of StationProfiles based on any of a variety of data formatting and storage methods may also be used.

Clock—As described herein, a Clock is utilized in sequencing content. In one embodiment content for a station is categorized. For example, songs that are the current hits and are getting the most airplay might be categorized as 'Current' songs. Content that was formerly a Current song, but is fading in popularity might be categorized as 'Recurrent.' Content that is introduced for variety might be categorized as 'Library.'

The Clock is an ordered list of these categories (called Buckets) used to create a song sequence. To create a sequence, a song is chosen from the first Bucket in the Clock, followed by the second Bucket and so on until the last Bucket is reached, whereupon sequencing continues by returning to the first Bucket. In practice, the creator of a Station may define as many Buckets as desired and sequence them as they see fit.

Bucket—As described herein, a Bucket is a category of content used in Clock sequencing as described above. In typical embodiments two types of buckets, SongBuckets and RuleBuckets are utilized. SongBuckets are buckets for which songs are explicitly categorized. That is, a BucketId attribute is associated with the song (i.e., by a content programmer) that categorizes the song explicitly into the Bucket with that matching identifier.

RuleBuckets categorize content by scoring one or more attributes of the song against the Bucket's rules. For example, a RuleBucket might select content that is 'older than 1975' and 'in the Hard Rock genre.'

A further specialization of the SongBucket is the HeavyRotation bucket. A HeavyRotation bucket is a bucket whose songs are designed to repeat at a given rate. Most buckets will implement logic to avoid the repetition of songs to ensure variety. HeavyRotation buckets contain the 'new, hot' songs that are desirable to repeat so long as they are still 'new and hot.'

Header—As described herein, a Header is content metadata that is used to describe the attributes of the content/song. A Bucket manages its inventory by maintaining a list of Headers. Set forth below is a table containing the type of information included within an exemplary Header of a given media file.

TABLE 1

Exemplary Header Information

| | | |
|---|---|---|
| SOF | 0xAA55AA55 | 4 byte |
| Number of Frames | Number of frames comprising the music file and including the header(s) | 2 byte |
| Data bytes in last frame | Number of data bytes in the last frame | 1 byte |
| Opcode | 0x0 - Data | 1 byte |
| Version | The version number of this header format | 1 byte |
| Format Flags | 0x01 = Display as Classical Track<br>0x02 = Multipart<br>0x04 = Can Overlay Ads<br>0x08 = Can Overlay Information | 1 byte |
| SongId | The Song Id used for song separation rules | 4 byte unsigned integer |
| PerformanceId | The Id of the performance used for content management | 4 byte unsigned integer |
| LicensorId | The Id of the content owner (i.e. record label) | 4 byte unsigned integer |
| Song Name Length | The length in bytes of the song name that follows | 2 byte short integer |
| Song Name | UTF-8 encoded song name | Song Name Length bytes |
| ArtistId | The Id of the featured artist | 4 byte unsigned integer |

TABLE 1-continued

Exemplary Header Information

| | | |
|---|---|---|
| Artist Name Length | The length in bytes of the artist name that follows | 2 byte short integer |
| Artist Name | UTF-8 encoded artist name | Artist Name Length bytes |
| Composer Name Length | The length in bytes of the composer name that follows | 2 byte short integer |
| Composer Name | UTF-8 encoded composer name | Composer Name Length bytes |
| AlbumId | The Id of the album associated with the track | 4 byte unsigned integer |
| Album Name Length | The length in bytes of the album name that follows | 2 byte short integer |
| Album Name | UTF-8 encoded album name | Album Name Length bytes |
| Release Year | The year of the original release of the song | 2 byte short integer |
| Popularity | Relative measure of song popularity | 2 byte short integer' |
| Style Length | Number of Style, Style Fit pairs to follow | Byte |
| Style | Id of a style associated with this song | 2 byte short integer |
| Style Fit | Relative strength of style association | 2 byte short integer |
| | Additional Style, Style Fit pairs | |
| Bucket Length | Number of Bucket, Date pairs to follow | Byte |
| Bucket | Id of a radio programming bucket | 2 byte short integer |
| Date | Date the song was programmed into the bucket as seconds since Jan. 1, 1970 | 4 byte unsigned integer |
| | Additional Bucket, Date pairs | |
| Energy | −1 or 0-4 value representing energy level of the track | Byte |
| Multipart Length | Number of Offset, Type, Name triples to follow | Byte |
| Offset sdfssdfsdf | Multipart offset | 4 byte unsigned integer |
| Offset Type | 0 = Audio Chapter<br>1 = Play Once Intro<br>2 = Play Always Intro<br>3 = Play Once Outtro<br>4 = Play Always Outtro<br>5 = Album Art [if not in mp4 container] | |
| Part Name Length | Length in bytes offset name to follow | 2 byte short integer |
| Part Name | UTF-8 encoded part name (for audio chapters only)<br>Additional parts<br>Padding or Piggyback data to fill frame | |
| CRC | CRC checksum on the frame contents | 4 bytes |

Attribute—As described herein, an Attribute is a logical name/value pair embodying a fact or piece of metadata about the content. The Header stores Attributes. For efficiency of transmission and storage, attributes may be stored in a fixed layout in the Header or stored as Id, Value pairs or ClassId, Id, Value triples. In the latter case, ClassId serves to specify the identifier namespace for Id so that multiple, overlapping identifier spaces can be used.

Rule—As described herein, Rules serve to combine Attributes and other derived information (for example, the last time the track was played) in order to form scores. Scores are ultimately used to determine playback order and priority during inventory management. Specializations of Rules include SequenceRules for scoring Headers based on the history of matching artists, albums, or tracks in the Sequence; AttributeRules for scoring Headers based on attribute matching; as well as RuleSets for combining a set of Rules into a single score. Other specializations of Rules may also be used.

RuleSet—As described herein, a RuleSet executes a set of rules and combines their scores in a specific way. There are specialized RuleSets for combining SequenceRules into sequence scores (SequenceRuleSet) and for combining AttributeRules into attribute scores (AttributeRuleSet).

MediaFile—As described herein, a MediaFile is the content actually rendered by the media player to affect playback of the content.

Sequence—As described herein, a Sequence is the list of content already played and in the queue to be played. The Sequence is examined to implement rules to limit repetition.

SequenceElement—As described herein, a Sequence Element is an element stored in a Sequence. Binds a Header with the timestamp when it was played for use with time-based SequenceRules.

Figure 4:
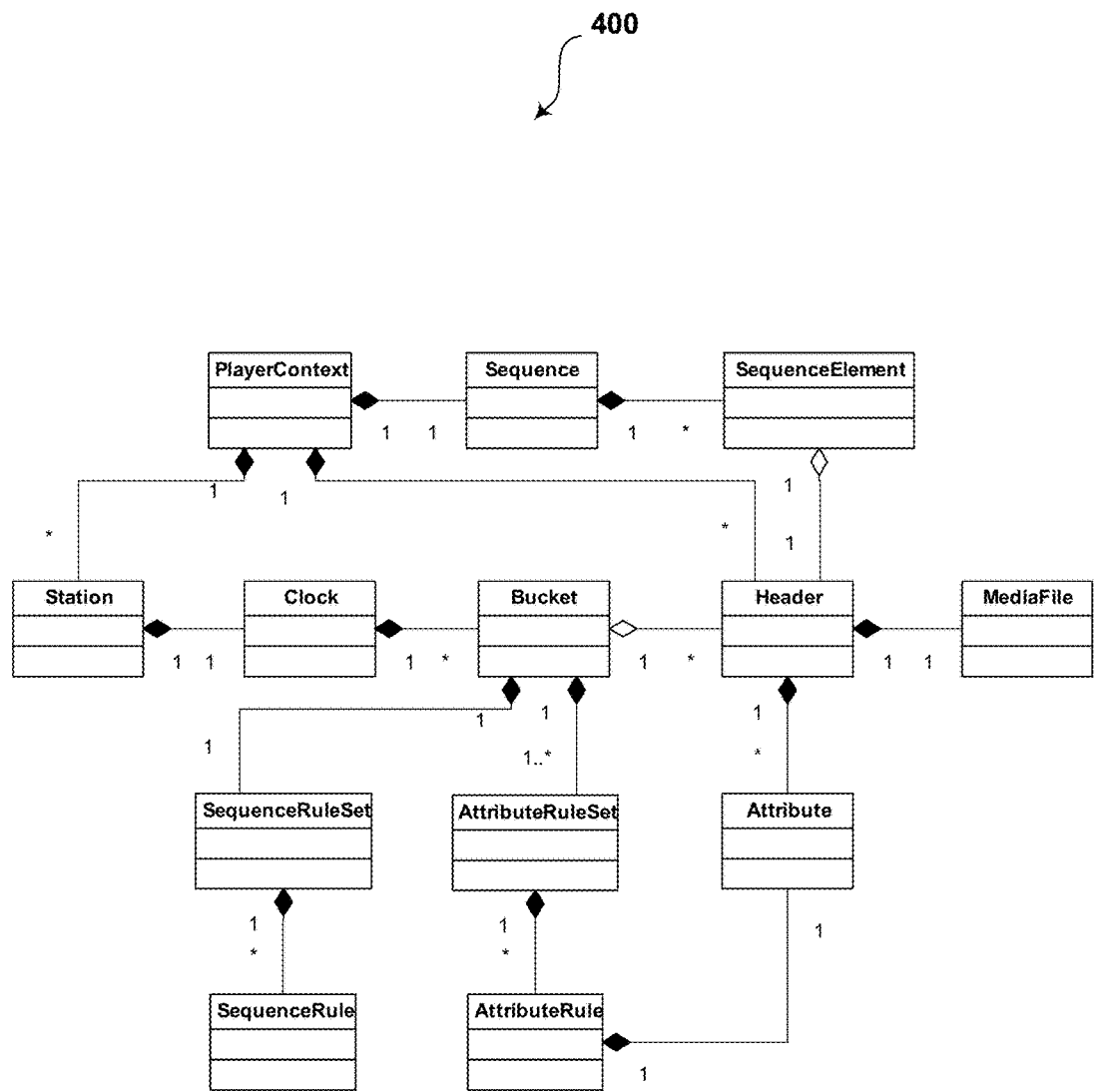
FIG. 4 illustrates an embodiment of an object configuration in accordance with aspects of the present invention.

FIG. 4 is a UML diagram showing an exemplary aggregation of the core objects described above.

Processing States

State transition diagrams of embodiments of the device as shown in FIGS. 5-8 illustrate high-level functional behavior and provide a roadmap for the detailed descriptions that follow. In typical embodiments the device will have separate threads of control running simultaneously under control of an operating system that handles thread and/or process scheduling. Thus, in typical embodiments the operations associated with the state diagrams will be operating simultaneously in their own contexts.

In the description that follows embodiments of state diagrams as illustrated in the associated figures are described. The program execution associated with the various state diagrams are typically implemented on one or more modules within the device, such modules typically including computer hardware, software, firmware and/or combinations of these elements. The computer software is typically stored on a computer readable medium such as memory and includes instructions configured to be executed by one or more processors. It is noted that, while the operations associated with the figures include events and states shown in the figures and described in the associated written description, it is apparent that other events and states including fewer, more, or different events and/or states than those shown in the figures are within the spirit and scope of the present invention. Accordingly, the state diagrams shown in the following figures are provided for purposes of illustration, not limitation.

Player States

Figure 5:
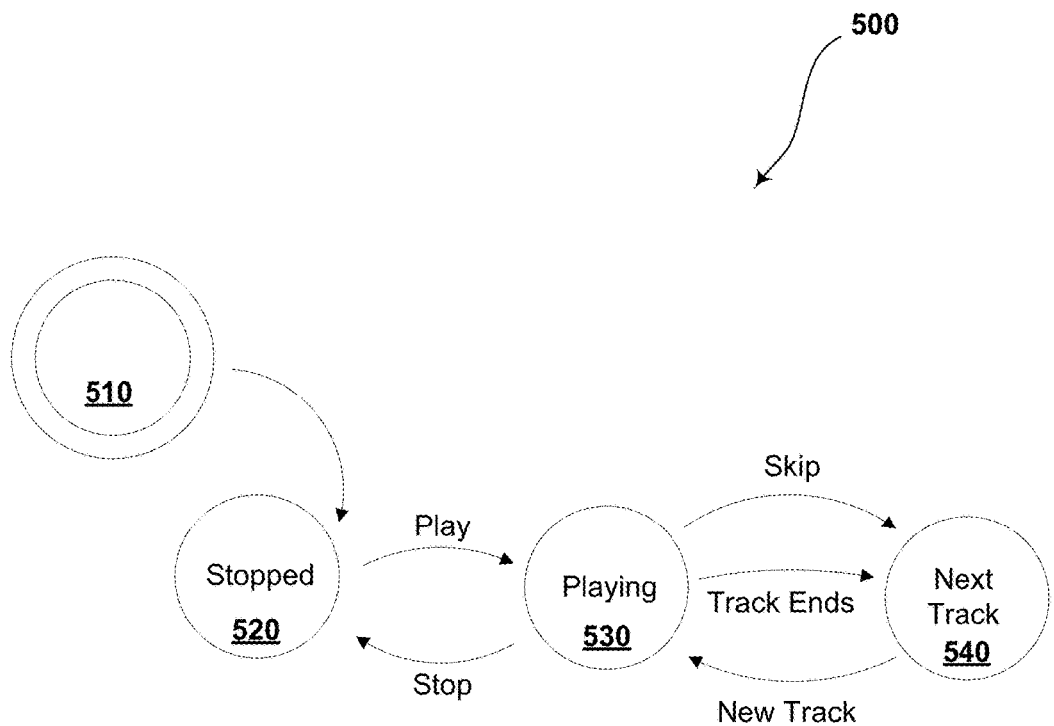
FIG. 5 is a state diagram showing an embodiment of a content playback implementation in accordance with aspects of the present invention.

Attention is now directed to FIG. 5, which illustrated an embodiment of a state diagram 500 representative of the processing states and events related to device playback of stored media files. These processing states are described in detail as applicable. An overview is as follows:

As shown in FIG. 5, process execution may first begin in an initialization state 510. Execution may then transition to a stopped state 520, wherein execution is stopped pending user input or other execution initialization. Upon receipt of a Play instruction or other input operation execution transitions to a Playing state 530 wherein playback of content such as audio files/tracks (MP3s, WMAs, etc.) is performed (i.e. the track is played/rendered on the device). A user may be able to provide input to direct execution of the device to Skip a track, or the track or file may end, wherein a Next Track state is entered, with execution proceeding to determine a new track to be played and then return execution to the Playing state 530. A user and/or other input may also be enabled to enter a Stop instruction wherein device execution transfers from Playing state 530 to Stopped State 520.

User Interface Handling States

Figure 6:
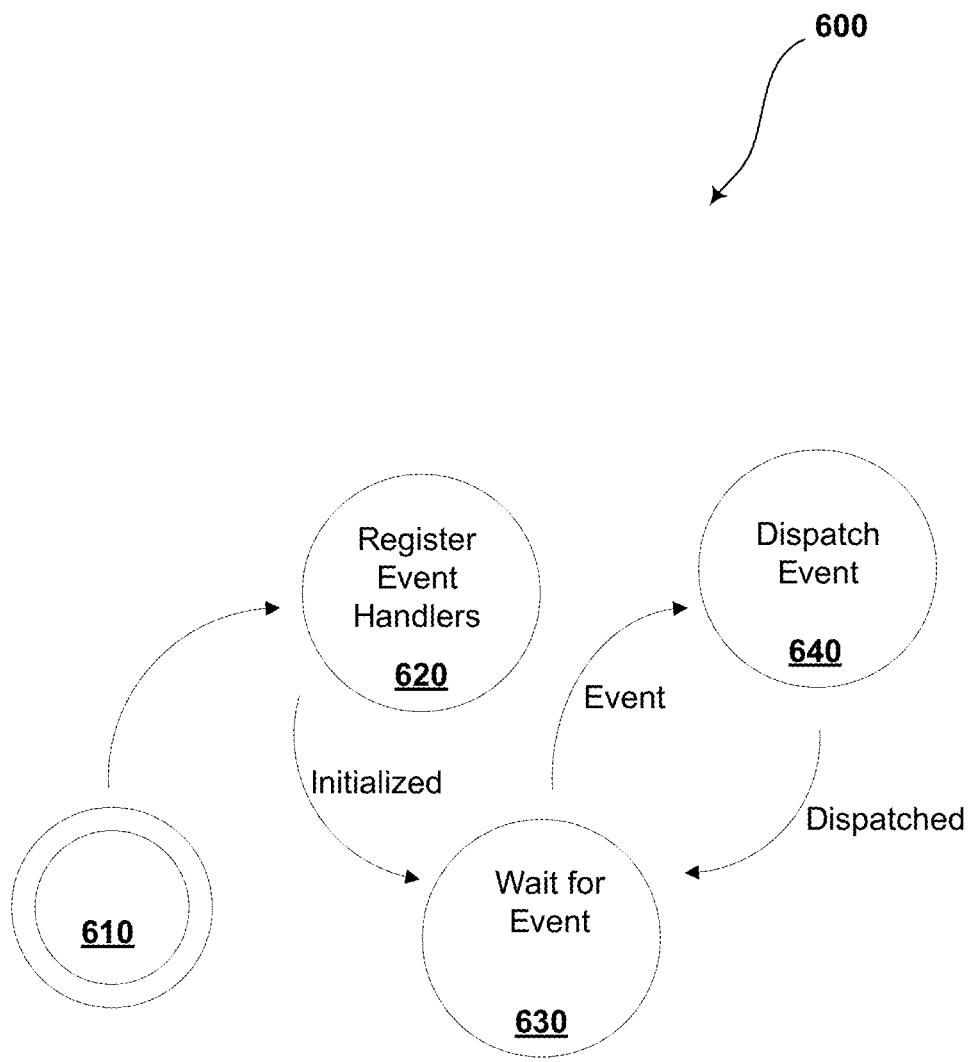
FIG. 6 is a state diagram showing an embodiment of a user interface implementation in accordance with aspects of the present invention.

FIG. 6 illustrates an embodiment of a state diagram 600 showing some of the states used in an implementation of a state machine providing a device user interface. An associated event processing table is shown below in Table 2. Additional states/functions that may be peripheral are not shown for purposes of clarity. After turn-on at state 610, execution proceeds to an initialization phase at state 620, where the application registers event handlers for the various input devices and other events generated by the device. Execution then proceeds to a Wait state 630. When an event is received, the handler is dispatched at state 640. The event handler may create a new thread to handle the event or place the event in the queue of an existing thread. Table 2 below further illustrates state and event processing of one embodiment of the invention.

TABLE 2

Event Processing

| State | Event | Handling | New State |
| --- | --- | --- | --- |
| Stopped | Play | Send "Play" event to Player thread. Update display for Playing state. | Playing |
| Playing | Stop | Send "Stop" event to Player thread. Update display for Stopped state. | Stopped |
| Playing | Skip | Skip handling. See Skip | Playing |
| Playing | Ban | Ban handling. See Banning Tracks Processing | Playing |
| Playing | Save | Save handling. See Saving Favorites Processing | Playing |
| * | Station Slider Update | Update the corresponding slider settings for the current stations. See <insert reference> | Unchanged |
| Playing | Progress | Update track progress indicator | Playing |
| Playing | NewTrack | Update display with current track info | Playing |
| * | NewChannel | Stop Player, change channel, update display, Start Player | Playing |
| * | * | Update the display with current UI view | Unchanged, Changes UI Sub-states |

Playing—The device renders content by transferring audio or other data from the current track to the decoder. The decoder decodes the data and sends the raw digital audio or other content to a digital to analog converter (DAC) or other output device such as a display, and to the device's audio amplifiers and line outputs.

Stopped—The device is not rendering content. The previous Playing sub-state may be preserved so that a return to the Playing state resumes where it left off Next Track—The device determines the next track to render. A new file/track is selected for rendering and control returns to the Playing state.

Wireless (Bidirectional) Processing States

Figure 7:
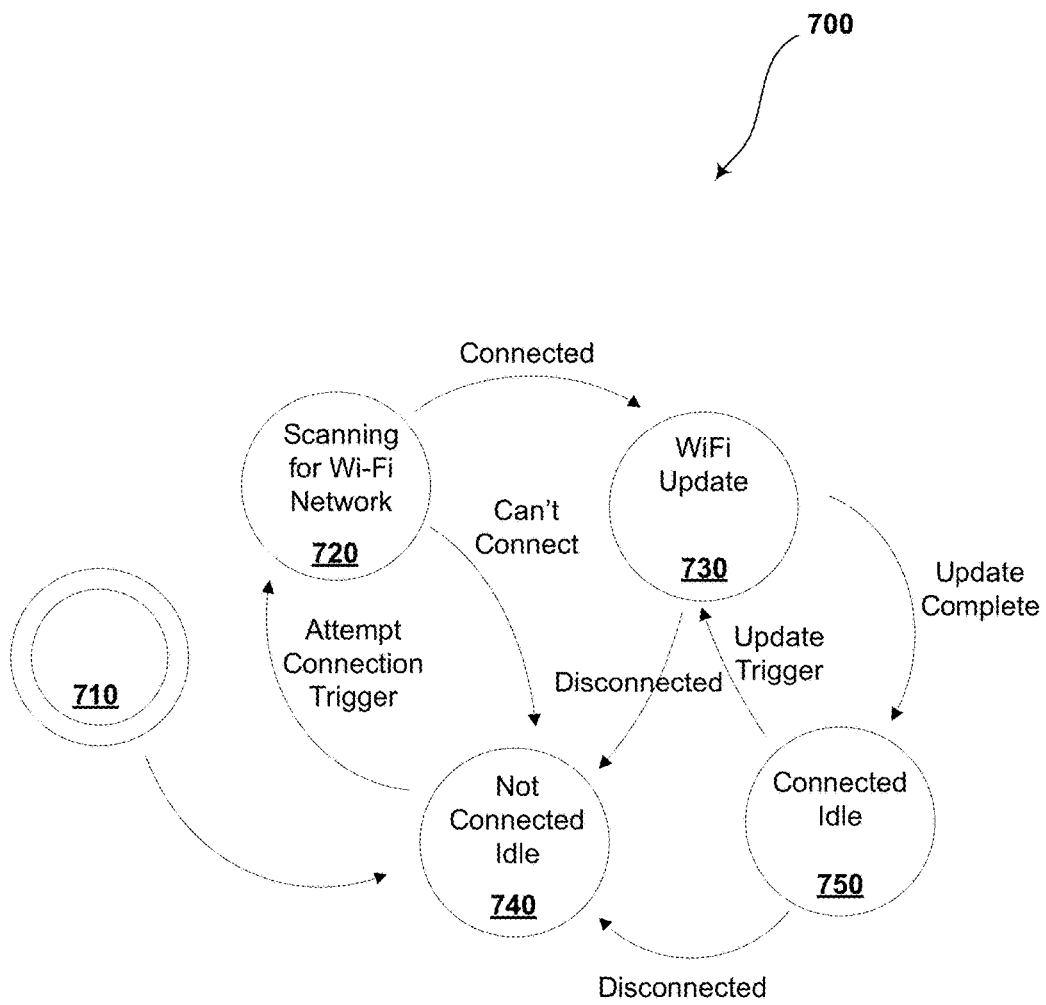
FIG. 7 is a state diagram showing an embodiment of a wireless connection implementation in accordance with aspects of the present invention.

State diagram 700 of FIG. 7 illustrates one embodiment of a set of processing states and events relating to connection of the device to wireless networks and to updating of media file content stored by the device via such networks. Once initialized at state 710, device execution may proceed to a Not Connected Idle state 740. When the device is not connected to a wireless network, the thread may be configured to wait for an event to trigger a connection, for example a timer expiring or an explicit request by the user to connect. Power management may also affect this logic. From this state, execution may proceed to a Scanning state 720 where potential connections may be detected. A time out may also be applied allowing execution to return to the Not Connected Idle state 740 after a predetermined period. If a connection is established execution may proceed to state 730, where a networking update may be performed based on desired network utilization. For example, if the connection succeeds, an update exchange sending information and/or receiving content with the content management system and/or any associated servers may be executed. If the update completes before disconnection of the device, the device may enter the Connected Idle state 750 and wait for triggers to initiate an additional update at state 730. Upon disconnection based on, for example, timeouts, user requests to disconnect, or other events, execution may be returned to Not Connected Idle state 740.

Antenna Processing States

Figure 8:
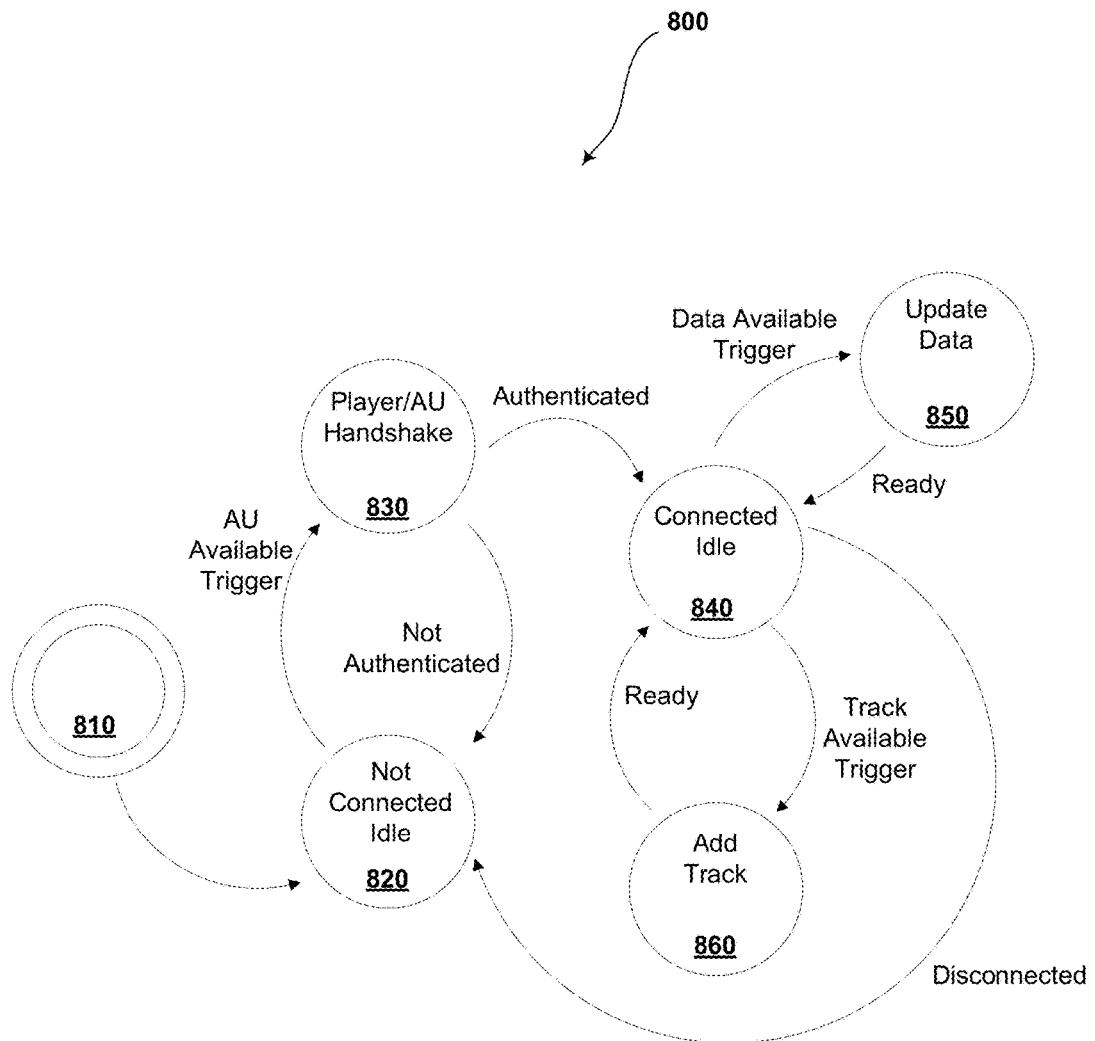
FIG. 8 is a state diagram showing an embodiment of content processing in a unidirectional connection in accordance with aspects of the present invention.

FIG. 8 is a state diagram 800 illustrating an embodiment of various processing states related to the processing of content in the case of unidirectional connections to a source of content. In one embodiment such a unidirectional connection is established between the playback device and a satellite-based delivery system through an Antenna Unit (AU) capable of being operatively connected to the playback device. The Antenna Unit is responsible for receiving tracks and data over the unidirectional (satellite) connection and creating regular files from the received signal.

In a preferred embodiment, the AU is implemented as a docking station that the device plugs into, for example, when the device is in a car. As shown in FIG. 8, after initialization at state 810, execution may proceed to a Not Connected Idle state 820. The device thread may remain in the idle state until it detects that it has been connected to the AU by, for example, a user request or AU trigger event. The device and the AU may then perform a secure handshake at Player/AU Handshake state 830 to authenticate one another and pass decryption keys or other information. In the event of authentication failure, the device may return to Not Connected Idle state 820 to repeat the process.

Once authenticated, thread execution may proceed to a Connected Idle state 840. In this state a Data Available trigger event may transition execution to an Update Data state 850 wherein a data file or files may be provided, after which execution may be returned to Connected Idle state 840. Likewise, track or other content availability may be signaled by a Track Available Trigger to transfer execution to Add Track state 860. In this state tracks or other content may be added, with execution then returned to Connected Idle state 840. The Connected Idle state may also allow for a transition to Not Connected Idle state 820 based on a disconnection signaled triggered by a user input, timeout, or other event.

Playback Processing

Playback processing concerns the implementation of various processes that are related to the User Interface and Player State Diagrams previously described. In the description that follows embodiments of processes as illustrated in the associated figures are described. These processes are typically implemented on one or more modules within the device, such modules typically including computer hardware, software, firmware and/or combinations of these elements.

The computer software is typically stored on a computer readable medium such as memory and includes instructions configured to be executed by one or more processors. It is noted that, while the processes associated with the figures include particular stages shown in the figures and described in the associated written description, it is apparent that other processes including fewer, more, or different stages than those shown in the figures are within the spirit and scope of the present invention. Accordingly, the processes shown in the following figures are provided for purposes of illustration, not limitation.

Start Station

Figure 9:
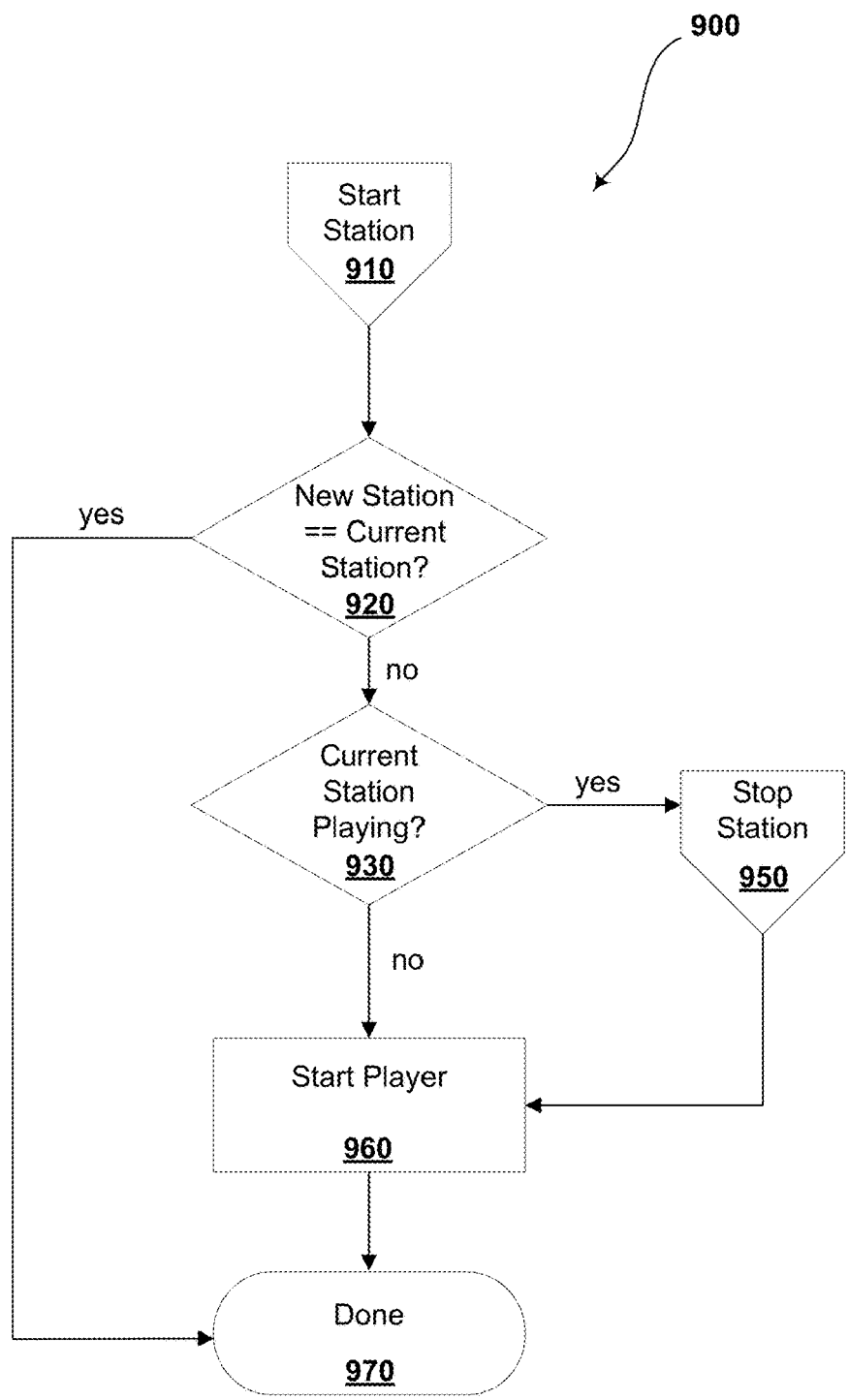
FIG. 9 is a flowchart showing an embodiment of a start station process in accordance with aspects of the present invention.

Attention is now directed to FIG. 9, which is a flowchart 900 representative of one embodiment of a Start Station process in accordance with aspects of the invention. Stations may generate the sequence of content to be played one or more items ahead. This allows the player to more efficiently pipeline content into the decoders. It may also allow for potentially faster skip operations as well as displaying to the user a song or songs that are to come in the playback sequence.

Figure 10:
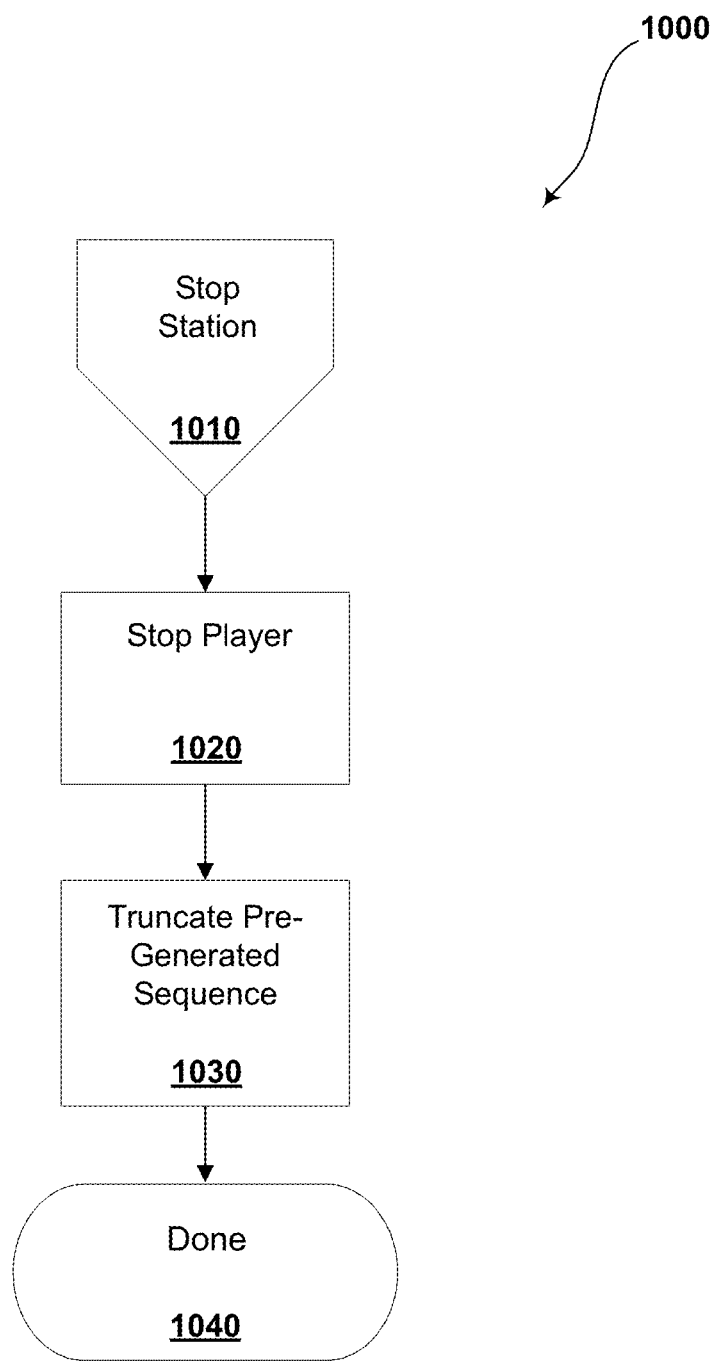
FIG. 10 is a flowchart showing an embodiment of a stop station process in accordance with aspects of the present invention.

As shown in FIG. 9, execution may begin with a Start Station initialization stage 910 wherein a user may select a particular station for execution or a station for execution may otherwise be selected. Stage 920 may then determine whether the desired station is the current station. If it is, the station selection process may be concluded by transitioning to stage 970. Alternately, if the desired station is not the current station, stage 930 may determine whether a current station is playing. If a station is playing, it is stopped at stage 950 (an implementation of this stage is further shown starting at stage 1010 as shown in FIG. 10), and execution transferred to Start Player stage 960. Alternately, if a current station is not playing as determined at stage 930, Start Player stage 960 may be directly executed. Playback/rendering of audio tracks and/or other content are then initiated at Start Player stage 960, after which execution of the Start Station process is completed at stage 970.

Stop Station

Referring now to FIG. 10, a flowchart 1000 representative of one embodiment of a Stop Station process in accordance with aspects of the invention is shown. Stop station execution begins at stage 1010, with execution transferring to Stop Player stage 1020 wherein station playback/rendering is halted. The portion of the sequence pre-generated for future playback may be truncated at stage 1030. The stop station process is then completed at stage 1040.

Skip

Skip handling is typically triggered by a user interface request to skip the current track. In typical embodiments, the device will allow users to skip certain tracks. However, the device logic must enforce certain business rules such as only allowing users with a specific tier of service to skip tracks, applying certain limits on the number of skips, or preventing users from skipping certain content such as advertisements.

Figure 11:
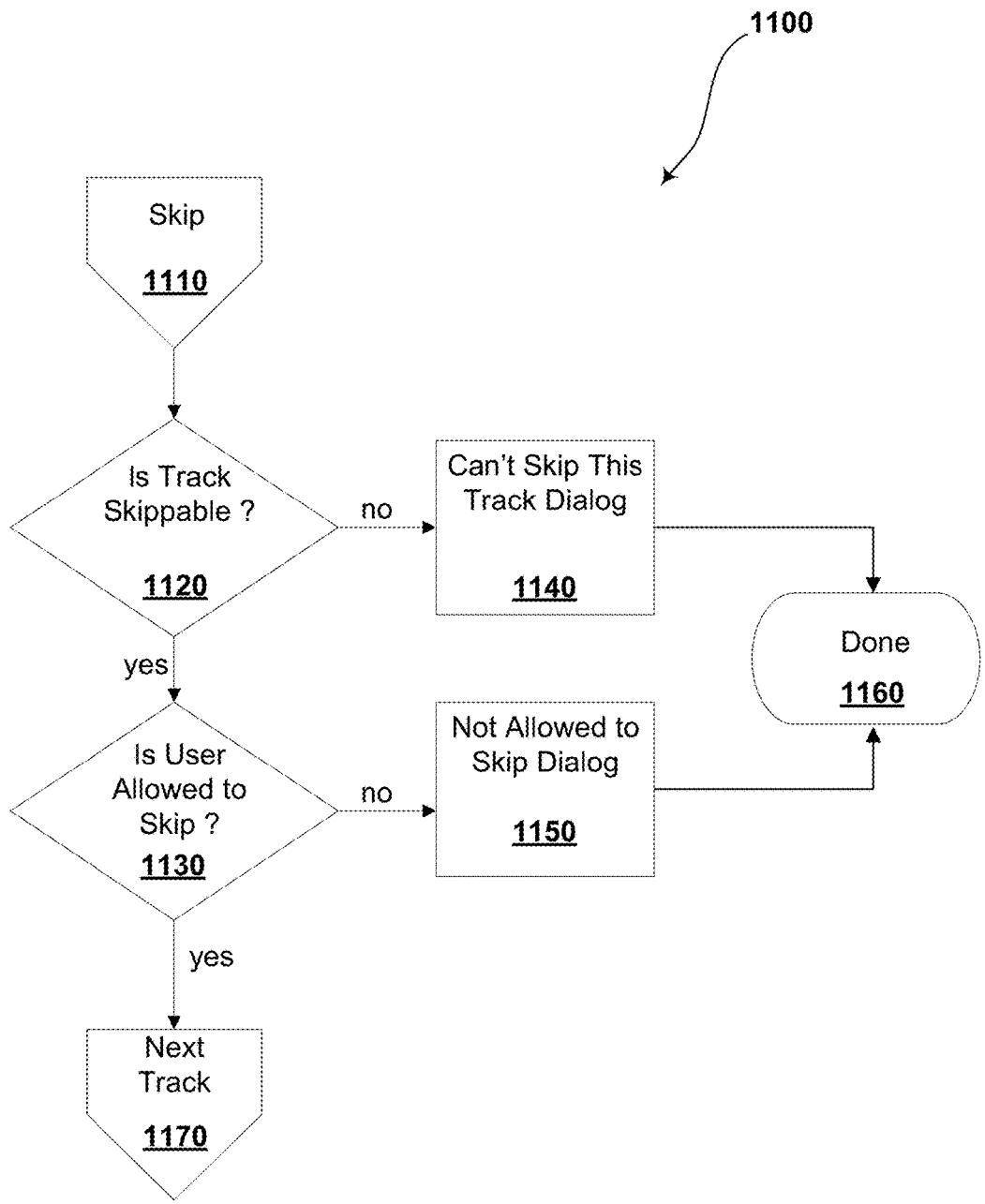
FIG. 11 is a flowchart showing an embodiment of a skip logic process in accordance with aspects of the present invention.

Referring now to FIG. 11, a flowchart 1100 representative of one embodiment of a Skip process in accordance with aspects of the invention is illustrated. As shown in FIG. 11, a skip process is typically initiated at stage 1110, such as by a user request. Execution proceeds to stage 1120, where a determination is made as to whether the track can be skipped (i.e. whether the track is "skippable"). Tracks may not be skippable based on user service limitations, content limitations, DMCA or other statutory requirements, or for other reasons. If a track is not skippable, a Can't Skip Dialog may be presented at stage 1140 providing a display, audible indication, or other indication that the track cannot be skipped, after which execution of the skip process is completed at stage 1160. Alternately, if a track is skippable, a second test may be applied at stage 1130 to determine whether the particular user's service allows skipping the track. This may be based on reasons such as those described above, as well as others such as the number of tracks skipped previously and the like. If the user is not allowed to skip the particular track a Not Allowed Dialog 1150 stage, providing a display, audible indication, or other indication that the track cannot be skipped, may be executed, with execution of the skip process then completed at stage 1160.

Figure 12:
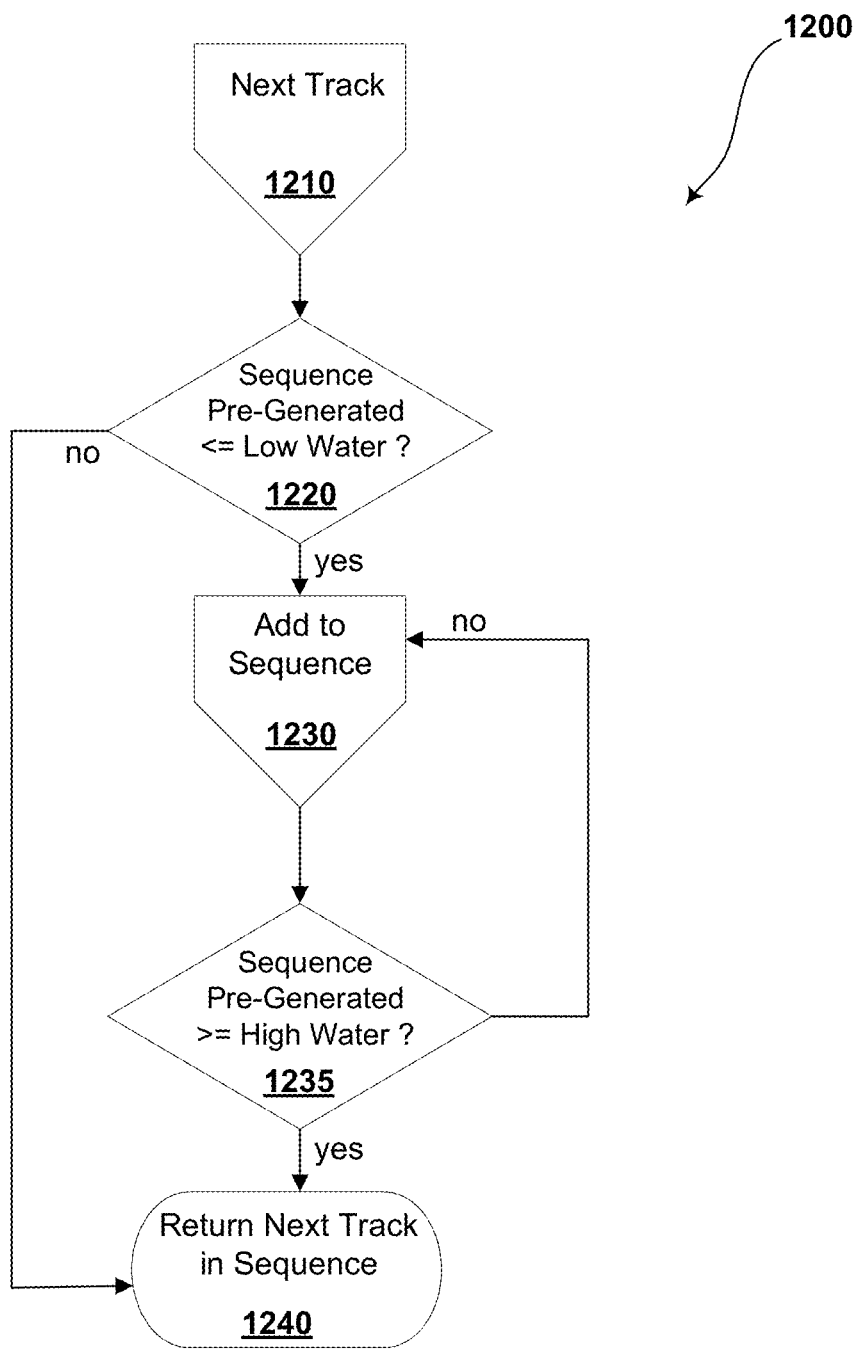
FIG. 12 is a flowchart showing an embodiment of a next track process in accordance with aspects of the present invention.

Alternately, if the track is both skippable and the user is allowed to skip the track, playback of the track may be skipped by transferring execution from stage 1130 to a next track stage 1170 wherein the next playable track may then be played/rendered (an implementation of the next track stage is further shown starting at stage 1210 as shown in FIG. 12).

Next Track

Figure 13:
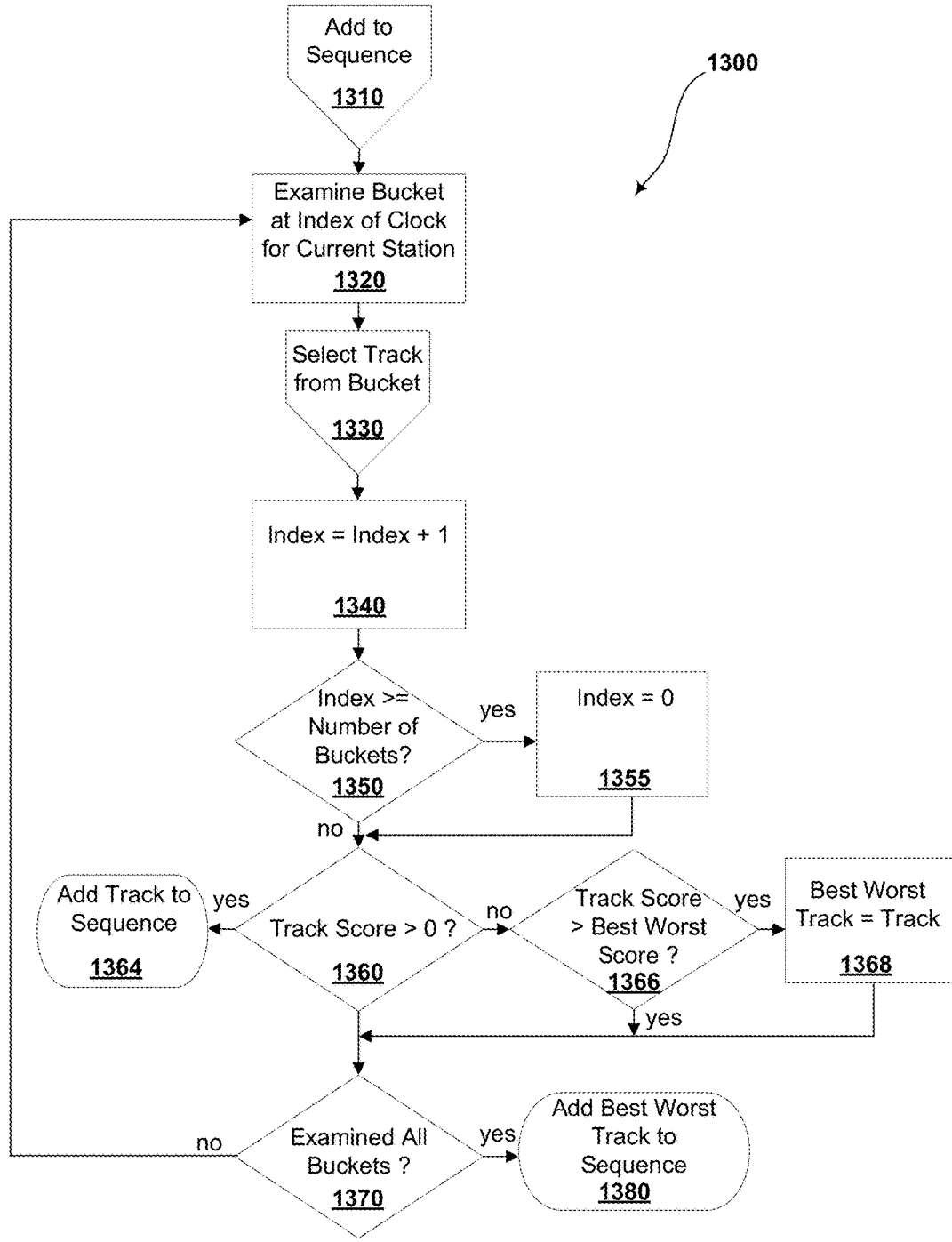
FIG. 13 is a flowchart showing an embodiment of an add to sequence process in accordance with aspects of the present invention.

Turning now to FIG. 12, a flowchart 1200 representative of one embodiment of a Next Track process in accordance with aspects of the invention is provided. The device triggers Next Track processing when it needs a new track to play. This logic pre-generates the sequence "high water" tracks ahead whenever the sequence falls to "low water" tracks into the future. More specifically, Next Track processing may begin at stage 1210 wherein execution proceeds to a test stage 1220 wherein the pre-generated sequence is tested to see whether the sequence has fallen below a low water mark. If the sequence has not reached a low water mark the Next Track process is completed at stage 1240 where the next track in the sequence is returned for playback/rending. Alternately, if the pre-generated sequence has reached a low water mark, new content may be added to the sequence at stage 1230 (an implementation of an add to sequence stage is further shown starting at stage 1310 as shown in FIG. 13) and then the sequence is again tested at stage 1235 to see if the track content has risen above a high water mark. If it has not, execution is returned to stage 1230 where another track is added to the sequence and the sequence is again tested at stage 1235. Once the sequence has risen above the high water mark execution is completed at stage 1240 with the next track in the sequence returned for playback/rendering.

Add To Sequence

Adding a track to a sequence is a core process in the playback processing logic. In a typical embodiment, this logic is driven by a clock object that orchestrates buckets to select the next track. As described previously and further detailed below, clocks are ordered, sequential, and cyclical lists of buckets. However, there are two special cases of clocks worth noting for alternate embodiments: a Dynamic Clock dynamically chooses the next bucket based on special purpose bucket sequencing logic, and a Trivial Clock contains a single bucket from which the next track is always chosen.

By scoring semantics convention, the Clock allows buckets to provisionally decline to return a track. If the track returned by a Bucket Selection process scores less than 0.0 (i.e., by convention is an undesirable track), the bucket is skipped. However, if all buckets return tracks that score less than 0.0, the highest scoring track (denoted as the Best Worst Track) is returned.

Figure 14:
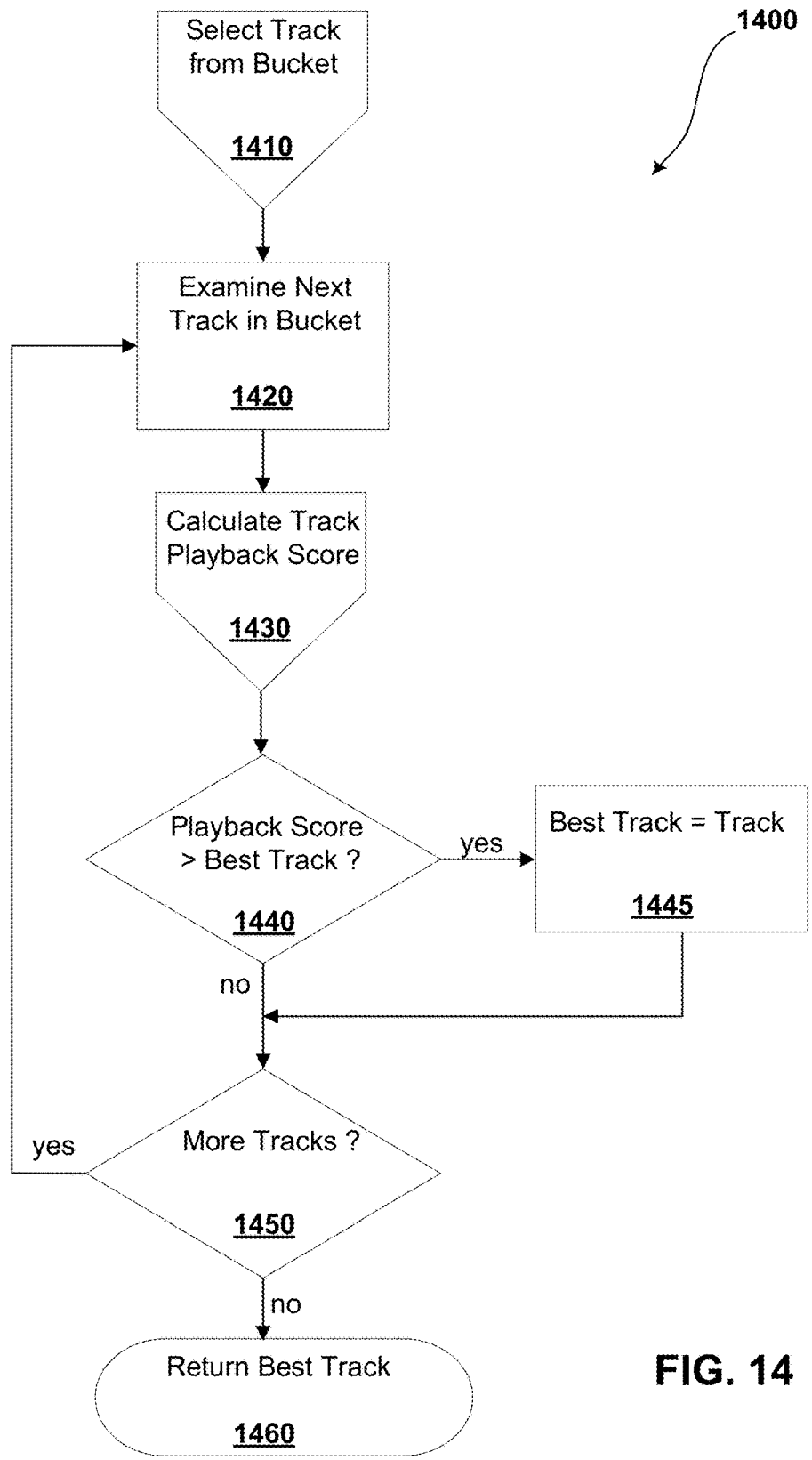
FIG. 14 is a flowchart showing an embodiment of a select track process in accordance with aspects of the present invention.

FIG. 13 is a flowchart 1300 depicting one embodiment of an Add to Sequence process further depicting this process. As shown in FIG. 13, an Add to Sequence process may begin at a start stage 1310, with execution proceeding to stage 1320 where the bucket at the index of the clock for the current station is examined. A track is selected from the bucket at stage 1330 (an implementation of a select track from bucket stage is further shown starting at stage 1410 as shown in FIG. 14), and the index is incremented at stage 1340. The index is tested at stage 1350 to determine if it is greater than the number of buckets. If it is, the index is then reset to 0 at stage 1355, with execution then proceeding to stage 1360. Alternately, if the index is less than the number of buckets execution proceeds to stage 1360 where the track score is tested. If the track score as tested at stage 1360 is greater than zero, the track is added to the sequence at stage 1364 and the add to sequence process is completed. Alternately, if the track score is less than or equal to zero the track score is tested against the best worst score at stage 1366. If the track score is greater than the best worst track score the tested track is then assigned to the best worst track. Otherwise, execution proceeds to step 1370 where examination of the number of buckets tested is done. If all buckets have not been tested, execution is returned to stage 1320 where the process is repeated. Alternately, if all buckets have been tested and no track has been added to the sequence at stage 1364, the best worst track is added to the sequence at stage 1380 and execution of the Add to Sequence process is completed.

Select Track from Bucket

Figure 15:
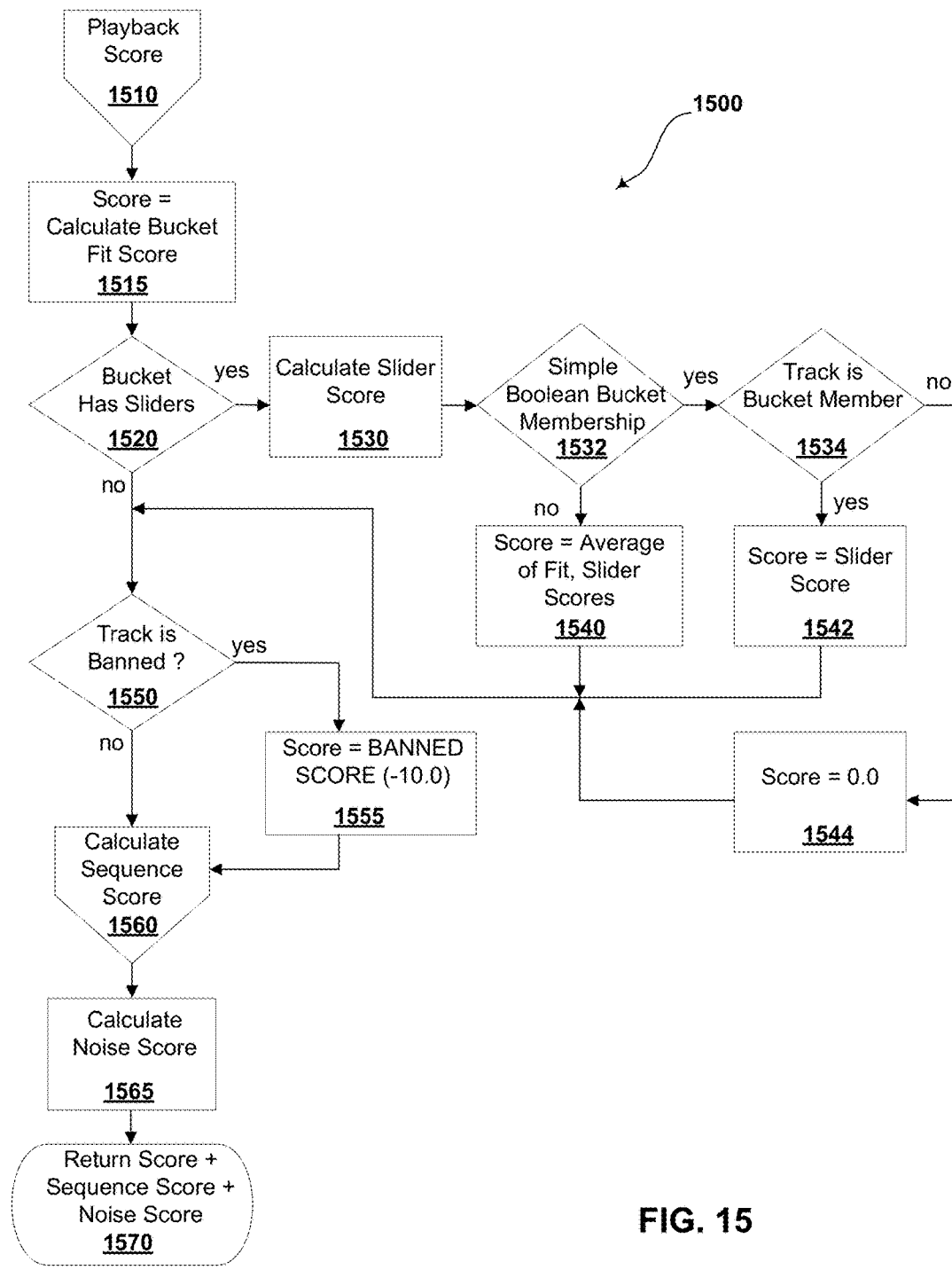
FIG. 15 is a flowchart showing an embodiment of a playback scoring process in accordance with aspects of the present invention.

Select Track from Bucket is a process by which the best track is selected from a bucket. Selection involves scanning the bucket for the best scoring track. There are obvious performance optimization schemes for scanning an entire bucket for the best scoring track; however the maximum size of a bucket is typically assumed to be small enough that these are likely to be of small benefit, and therefore a simplified process 1400 as shown in FIG. 14 is illustrated. As shown in FIG. 14, the Select Track from Bucket process begins at a start stage 1410, with execution proceeding to stage 1420 where the next track in the bucket is examined. A track playback score may then be calculated at stage 1430 (an implementation of a playback scoring stage is further shown starting at stage 1510 as shown in FIG. 15) and this playback score may then be compared to a Best Track score at stage 1440. If the current track score is greater than the Best Track score, the current track is set to the Best Track at stage 1445, and execution is returned to stage 1450. Alternately, if the current track scores lower than the Best Track at stage 1440 execution may proceed to stage 1450 where a determination of remaining tracks in the bucket is made. If there are remaining tracks in the bucket execution returns to stage 1420 where the process may then be repeated. If there are no remaining tracks in the bucket, execution proceeds to stage 1460 where the identified Best Track is returned/selected.

When there are significant differences in the quality of tracks available to be selected, that is, the available tracks have a wide range of scores, it is desirable to choose the best track. In typical embodiments, it is generally considered a bad idea to 'ration' the best tracks by mixing in poorer tracks; however, such an approach may be employed in some embodiments. In an exemplary embodiment, front-loading the sequence with the best tracks is considered preferable for at least the following reasons:

1. Additional good tracks may be received before the next bucket selection.
2. The user may end the session or switch to a different channel at any time.
3. The scores of tracks change as the session progresses and previously played 'good' tracks become sufficiently rested to be repeated.

It is also considered desirable that the scoring methodology not be so rigid that the sequence becomes deterministic or is perceived as such by the user. For this reason, a random 'noise' component may be added to the scores to reduce the likelihood of this perception. It is noted that the description of certain preferred embodiments defines certain conventions for scoring. These are designed to create semantic relationships between the scores by defining conventions relating to the meaning of the scores. It will, however, be apparent to those skilled in the art that other scoring conventions are possible assuming they preserve a consistent interchange between the different score types.

For instance, one example of a useful semantic relationship consistent with the invention involves the relationship between minimum and target rest to content fit. In particular, when a track has already been played, it may be "rested" for a certain minimum number of plays (i.e., a "minimum rest" period) before becoming eligible to be played again. Upon expiration of a "target rest" period, the track is deemed to be sufficiently "rested" to be nearly as eligible for playback as a track that has never been played. Content fit determines how well a track matches the ideal track and is typically a function of the sliders in SongBuckets or a combination of the slider scores and the rule scores in RuleBuckets.

Continuing with this example, a balance between content fit and sequencing rules like "rest" may be achieved by defining a convention (i.e., a semantic relationship) applicable to the meaning of the scores. In general, a content fit score of 1.0 may be used to define a perfect fit. A sequence score of −1.0 or less means the track is not eligible for play, as does a combined score of 0.0. Relating this convention to rest, a track gets a large negative sequence score after having been just been played. This decays to −1.0 as the rest approaches target and further decays toward 0.0 as the rest exceeds the target.

Playback Scoring

Attention is now directed to FIG. 15, which is a flowchart 1500 depicting one embodiment of a Playback Scoring process in accordance with the invention. When scoring the tracks in a bucket to determine Bucket Selection, it may be desirable to look at the fit of the track to the bucket, the fit of the track to the current slider settings, and how well the track obeys the sequencing rules relative to the history of tracks that have already been played or are queued for playback. In addition, a large negative score may be assigned to tracks that have been banned at either the performance or artist level. An overview of the process shown in FIG. 15 is provided below, followed by additional details of aspects of scoring.

As shown in FIG. 15, a Playback Score process may begin at start stage 1510 with execution proceeding to stage 1515 where score is assigned a calculated Bucket Fit Score. The Bucket is next tested to determine if it has sliders for user customization at stage 1520. If it does, a slider score is calculated at stage 1530. At stage 1532 the track is tested for simple Boolean membership. If it does not have simple Boolean measurement, the track score is assigned the average of the fit and slider scores at stage 1540. If it does, the track is tested to determine if it is a bucket member. If it is a bucket member the score is assigned the value of the slider score at stage 1542. Alternately, if it is not a bucket member, the score is assigned a value of zero at stage 1544. Following stages based on whether the bucket has a slider, execution resumes at stage 1550 where the track is tested for banning. If the track is banned it is assigned a very low score (for example, −10) at stage 1555. If it is not banned a sequence score is calculated at stage 1560, a noise score is calculated at stage 1565, and the score, sequence score, and noise score are returned/provided to other stages at stage 1570. Additional details and features related to FIG. 15 are further described below.

Bucket 'Fit' Score

The Bucket Fit score determines how well the track fits the category of the Bucket. In a typical embodiment, for SongBuckets, all songs assigned to the bucket score a perfect value of 1.0. All songs not assigned to the Bucket score the minimum value of 0.0. This is also denoted herein as a 'Boolean' membership. For RuleBuckets, the fit score is the result of executing the AttributeRules against the song attributes. The fit score for RuleBuckets, by convention, is a score between 0.0 (worst fit, not in Bucket) to 1.0 (best possible fit).

Slider Score

Slider Rules allow the user to customize the station. When applied during sequencing, they bias track selection towards tracks with certain attributes. When applied during Inventory Management (as discussed in successive sections), they bias the addition of new tracks towards tracks with certain attributes. As the name implies, Slider Rules may be conceptually or actually connected to sliders or knobs in the User Interface. Exemplary slider implementations are further described in the related applications incorporated herein by reference. In particular, U.S. Provisional Patent Application Ser. No. 60/886,283 describes exemplary embodiments of such sliders.

In typical embodiments Sliders are associated with a Station, although the effects of the slider may differ depending on the type of Bucket. The following exemplary sliders bias track selection in a preferred embodiment:

Newer←→Older
Harder←→Softer
Popular←→Obscure
Favorite←→Non-Favorite

Slider Attributes

By convention, slider attributes are defined as either 'Raw' or 'Cooked.' A 'Raw' slider attribute contains an actual value, typically associated with the attribute. For example, AlbumReleaseYear is a Raw slider attribute that contains a value based on release date between approximately 1950 and 2006.

Cooked slider attributes return a value between (by convention) −1.0 and 1.0. For example, a Popularity Cooked slider attribute is shown below in Table 3.

TABLE 3

Embodiments of Slider Attributes

| Popularity | Cooked Slider Attribute Value |
|---|---|
| Extremely popular, smash hit | 1.0 |
| Very popular | 0.75 |
| Well known | 0.50 |
| Somewhat known, not quite obscure | 0.0 |
| Not well known, deep, obscure | −1.0 |

Raw slider attributes may be converted into cooked slider attributes by rescaling them using a Rescaling Rule that includes a Min, Max, and Median parameter. This allows, for example, for an 80's radio station to define 'newer' as 1989 and 'older' as 1980, with 1985 as 'median' (the term median is used herein not in the strict mathematical sense, but to denote a value that should map to the center of the slider range—that is, a value that is neither 'old' or 'new' for the given station). For a simple linear interpolation (allowing the Median to not be centered between Max and Min) we have:

For raw sliders values v where v>Median:

$$v'=(v-\text{Median})/(\text{Max}-\text{Median})$$

For raw slider values v where v<Median $$v'=(v-\text{Median})/(\text{Median}-\text{Min})$$

This puts the −1.0 score on Min, the 0.0 score on Median, and the 1.0 score on Max, with a linear interpolation for values between these points. However, a linear interpolation does not account for outlying data points beyond Min and Max. Such points will exceed the −1.0 . . . 1.0 convention or will cease to be differentiated if capped. In some embodiments, a better way of cooking sliders during rescaling may be to apply an exponential decay function such that the cooked scores decay towards 1.0 as the raw score increases from the Median towards the Max. Symmetrically, scores decay towards −1.0 as the raw score decreases from the mean toward the min.

For values >=Median:

$$v' = 1.0 - e^{-\lambda v}$$

And for values <Median:

$$v' = -1.0 + e^{-\lambda' v}$$

As shown here, v represents the raw slider value and v' is the cooked slider value. $\lambda$ is the decay constant that controls the speed of decay. We can determine a suitable value for $\lambda$ by determining how close we want the score to be to 1.0/−1.0 for values of Max and Min. We can determine this in terms of how many half-lives of decay should remain at the Max/Min. For example, 3 half-lives is a decay of 0.5+0.25+0.125=0.875 leaving a residual decay of 0.125 for scores that out lie the max.

$$t_{1/2} = (\text{Max} - \text{Median})/n_{half\text{-}lives}$$

Half-life is related to $\lambda$ as follows:

$$t_{1/2} = \frac{\ln(2)}{\lambda}$$

Re-arranging for $\lambda$:

$$\lambda = \frac{\ln(2)}{t_{1/2}}$$

Substituting into the above we have:

$$\lambda = \frac{\ln(2)}{(\text{Max} - \text{Median})/3}$$

Similarly:

$$\lambda' = \frac{\ln(2)}{(\text{Median} - \text{Min})/3}$$

Figure 16:
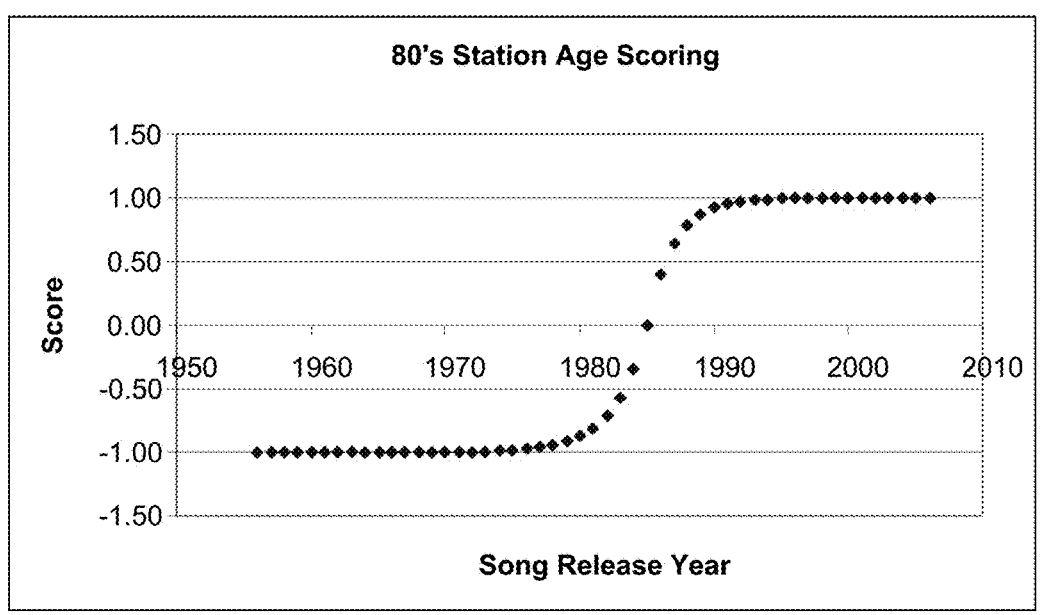
FIG. 16 is a graph of song aging results for an 80's station based on an embodiment of the present invention.
Figure 17:
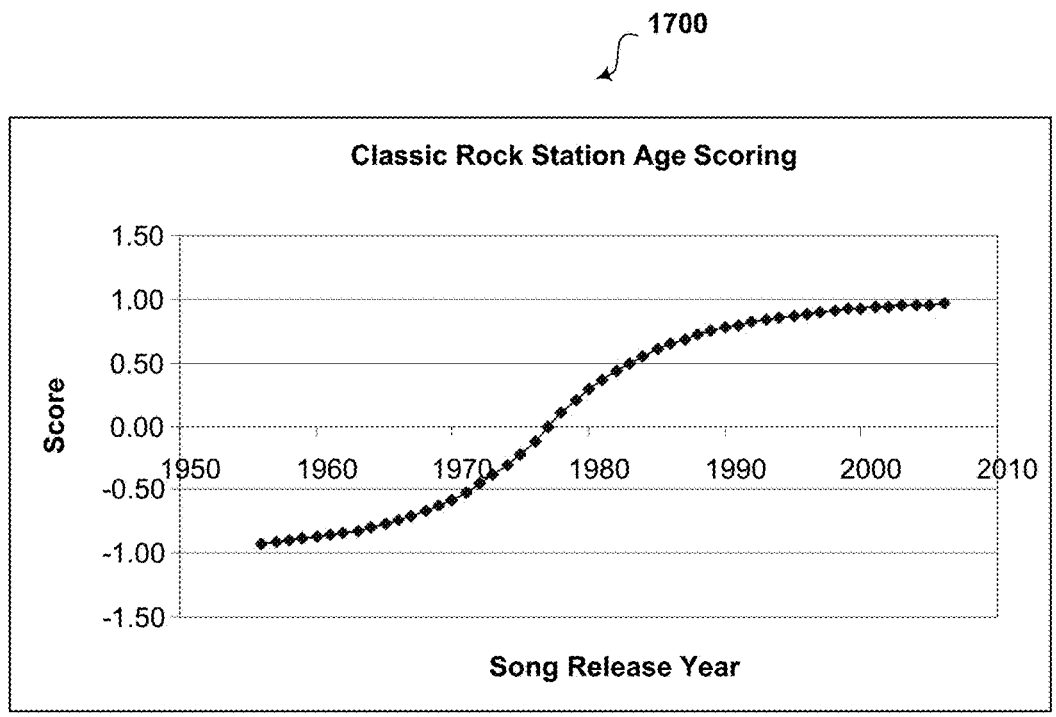
FIG. 17 is a graph of song aging results for a Classic Rock station based on an embodiment of the present invention.
Figure 18:
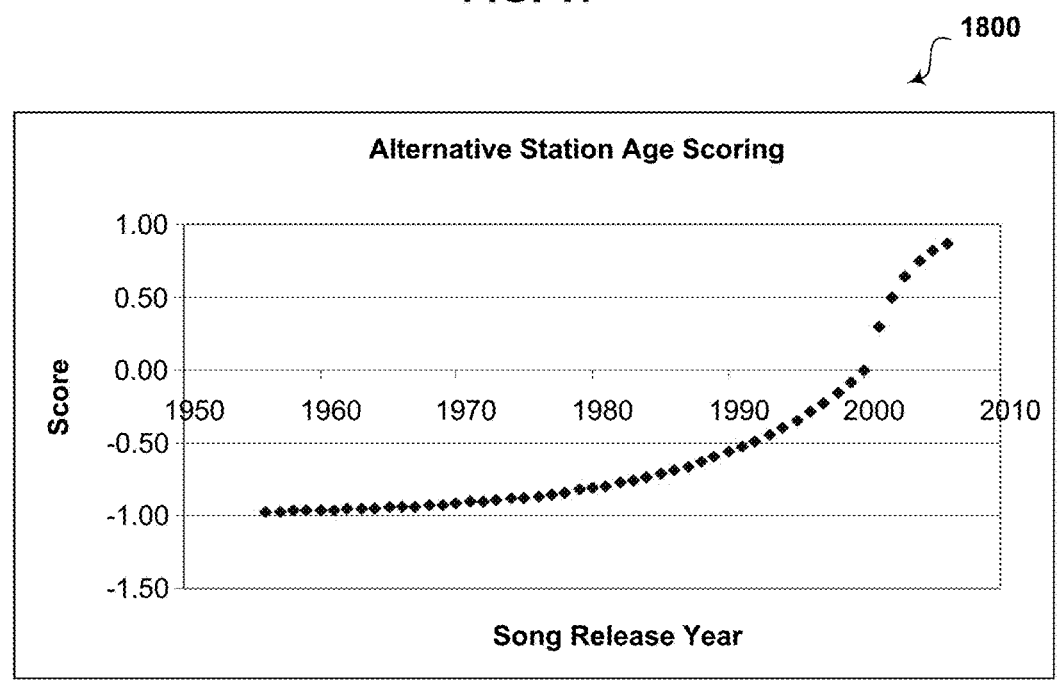
FIG. 18 is a graph of song aging results for an Alternative station based on an embodiment of the present invention.

FIGS. 16-18 are plots of age versus score profile for several embodiments of representative stations generated using the above equations. FIG. 16 shows a plot 1600 illustrating age scoring for an "80's" station characterized by the following parameters: Min=1980, Median=1985, Max=1989. Similarly, FIG. 17 shows a plot 1700 generated for a "Classic Rock" station characterized by the parameters of Min=1960, Median=1977, Max=1995. Finally, FIG. 18 shows a plot 1800 for an "Alternative" station characterized by the parameters of Min=1975, Median=2000, Max=2006.

Slider Scoring Rule

Once the slider attribute is 'Cooked', that is, converted to a standard range (−1.0 . . . 1.0 by convention), it can be converted into a slider score using the default slider scoring rule:

Score=1.0−(Slider Weight/2.0)+ ((CookedAttributeValue*Slider Weight)/2.0)

A more generalized version of this formula is:

Score=MaxScore−(DynamicRange/2.0)+ ((NormScore*DynamicRange)/2.0)

Where MaxScore is the maximum possible score. DynamicRange is the maximum delta from MaxScore, such that MinScore=MaxScore−DynamicRange. NormScore is a normalized score in the range of −1.0 to 1.0. Certain properties of this formula make it desirable for a slider application. These include:

Generating scores in the 1.0-0.0 range that match desired conventions.

The SliderWeight can be modulated along with the position of the slider to control the magnitude the attribute value contributes to the score.

A SliderWeight of 0.0 generates a uniform 1.0 score for all attribute values, which is ideal for a centered slider.

The negation of a slider weight inverts the scores in a symmetrical way. That is, the score order produced by a SliderWeight of 1.0 will be exactly reversed with a SliderWeight of −1.0. The score deltas in both lists will be symmetric.

Combining Multiple Sliders

If multiple sliders are in effect simultaneously, they may be combined to form a single score. In one embodiment, the average of all slider scores for which the SliderWeight is not 0.0 is taken (if all sliders are weighted 0.0, the slider score is set to 1.0). In some circumstances, a weighted average of the slider scores or other techniques to balance the contribution of unequal sliders may also be used. However, this approach should not be necessary if the attribute scores are well balanced across different types of sliders.

Sequence Rules

Sequence rules are used to score a candidate track for bucket selection against the current sequence. In one embodiment, sequence rules generate scores according to the following conventions:

TABLE 4

An Embodiment of Sequence Rules Scoring

| Score | Semantic |
| --- | --- |
| <−1.0 | Disqualifies track for playback |
| >=−1.0 and <0.0 | Technically eligible for playback, although suboptimal to the degree of the negative score. |
| 0.0 | Track is fully eligible for playback. Nothing in the sequence history discourages the track from being played |
| >0.0 | Not typically used for Sequence Scores. May indicate a HeavyRotation track that is overdue for playback. |

Recall that the Clock may be configured to skip a Bucket if the best track scores <=0.0. By convention, the best possible Bucket/Slider fit is 1.0, so the sequence score must be greater than −1.0 to render an otherwise perfect track playable.

Artist Sequence Rules

Artist Sequence Rules can be configured to typically generate a 0.0 or −1.0 score. The default Artist Sequence rule is parameterized by the number of times an Artist can appear in a sub-sequence, and the size of the sub-sequence to check.

If the artist associated with the track being scored appears more than the given number of times in the interval, the rule returns −1.0. Otherwise the Artist Sequence Rule returns 0.0. Intervals may be specified in terms of time or number of tracks. Number of tracks is generally preferred for simplicity of implementation and better overall functionality (i.e. the device won't play an artist back-to-back regardless of how much time elapses between tracks). However, time based rules may be required to implement the sequencing rules specified by the Digital Millennium Copyright Act (DMCA) or by other statutory or regulatory content playback requirements.

Album Sequence Rules

Album Sequence rules are analogous to Artist Sequence Rules, except it is the Album associated with the track that is checked against the sequence. Album Sequence Rules are not typically used except in enforcement of DMCA rules or other statutory or regulatory requirements.

Track Sequence Rules

Track Sequence Rules are used to ensure that a track is not repeated too frequently. The term "rest" is used herein to denote the number of intervening tracks that are played between plays of a given track. Each Bucket has the notion of minimum rest and target rest. Minimum rest is the minimum number of tracks that must be played between plays of a track. Target rest is the ideal number of tracks that must be played between repetitions.

By convention, when a track has less than the minimum rest, its Track Sequence Score is less than −1.0. When a track reaches minimum rest, its Track Sequence Score is −1.0. As a track approaches target rest, its score moves towards 0.0. In typical embodiments it is desirable to heavily discourage the playing of tracks with less than minimum rest. Between minimum rest and target rest, there is a trade-off between optimal rest and best fitting track. Beyond target rest, the influence of the sequence score should wane, but there should still be a differentiation between played and unplayed tracks.

In an exemplary embodiment, to model this intended behavior, an exponential decay function may be used to decay the sequence score penalty towards zero. Exponential decay is a function where the rate of decay of a quantity is proportional to the amount of the quantity remaining. For a quantity N and decay constant $\lambda$ we have:

$$\frac{dN}{dt} = -\lambda N$$

The solution to this differential equation is the generalized function for exponential decay at time t where $N_0$ is the initial quantity.

$$N(t) = N_0 e^{-\lambda t}$$

It is desirable to choose $N_0$ and decay constant $\lambda$ such that $N(T_{Minimum\ Re\ st}) = -1.0$ and $N(T_{T\ arg\ et\ Re\ st}) =$ noise floor. The noise floor represents a score low enough that the random noise added to the scores to induce variety will dominate over the influence of additional rest. An exemplary approach begins by calculating how many half-lives are required between $T_{Minimum\ Re\ st}$ and $T_{T\ arg\ et\ Re\ st}$:

$$n_{half-lives} = -\log_2(|\text{noise\_floor}|)$$

For example, if the noise floor is −0.0625, we need 4 half-lives to decay the score from −1.0 to −0.0625. The size of a half-life in number of tracks is can be determined as follows:

$$t_{1/2} = (T_{T\ arg\ et\ Re\ st} - T_{Minimum\ Re\ st}) / n_{half-lives}$$

Half-life is related to $\lambda$ as follows:

$$t_{1/2} = \frac{\ln(2)}{\lambda}$$

Re-arranging for $\lambda$:

$$\lambda = \frac{\ln(2)}{t_{1/2}}$$

Substituting into the above we have:

$$\lambda = \frac{\ln(2)}{(T_{Target\ Rest} - T_{Minimum\ Rest}) / -\log_2(|\text{noise\_floor}|)}$$

$N_0$ can then be determined as the initial score that will decay to −1.0 at $T_{Minimum\ Re\ st}$ $$N_0 = -1.0 \cdot 2^{T_{Minimum\ Re\ st}/t_{1/2}}$$

Figure 19:
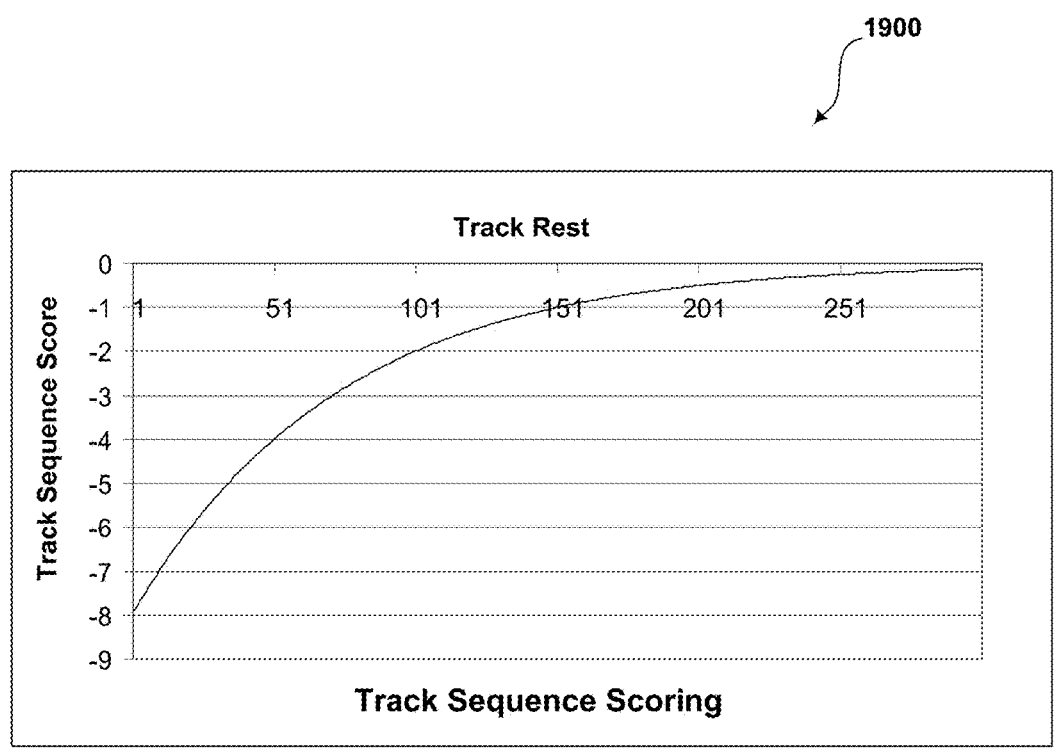
FIG. 19 is a graph of track sequence scoring results as a function of rest for an embodiment of the present invention.

FIG. 19 shows a graph 1900 of sequence score as a function of track rest for one embodiment under the following conditions: Target Rest is 300, Minimum Rest is 150, Noise floor is 0.0125.

Having determined the values of $N_0$ and $\lambda$ based on constants from the track sequence rules associated with the bucket, track sequence scores for each track can be calculated. If the track has not been played, the track sequence score is 0.0. If the track has been played, the number of tracks since the last play can be counted and used as 't' in the track sequence scoring formula:

$$N(t) = N_0 e^{-\lambda t}$$

To ensure maintaining differentiation between played and unplayed tracks, a minimum sequence penalty for played tracks can optionally be introduced and used as a ceiling for sequence scores of played tracks.

TrackSequenceScore=MIN(MinimumPenalty,$N(t)$)

In a typical embodiment, MinimumPenalty is preferably a function of MaxNoise; for example it can be set to Max-Noise/2.0. This ensures that the penalty of a played track, no matter the rest, is not washed out by the noise used to randomize the system. A particularly efficient way of computing rest for a track may be to keep a global variable that is incremented with each track played on the device. When a track is played, the value of the variable is recorded in the track header. Thus the rest is the difference between the current value and the value stored in the track.

Combined Scoring

The Fit, Slider, and Sequence scores are typically combined to generate a score that ranks the tracks in the Bucket for playback priority. Different combining rules may be applied. In an exemplary embodiment, for playback, different scoring may be used to rank the tracks for RuleBuckets and SongBuckets.

For RuleBuckets:

PlaybackScore=((FitScore+SliderScore)/2)+SequenceScore+Noise

For SongBuckets:

PlaybackScore=SliderScore+SequenceScore+Noise

That is, the FitScore and the SliderScore for Buckets are averaged to calculate fit, then the SequenceScore and Noise are added.

By convention, SongBuckets have no FitScore; all songs assigned to the Bucket are assumed equally fitting. That is, the Bucket fit is a Boolean or filtering function. For these buckets, the SliderScores are used to determine playback fit and add the SequenceScore and Noise.

For an exemplary embodiment, the main conventions for combined scores are as follows:

1. The combined score must be greater than 0.0 for the track to be eligible for play. If all tracks in the Bucket score <=0, the Bucket will be skipped.
2. Fit and Slider scores are combined to form a 0.0-1.0 score that reflects the relevancy of the content to the desired content programming for the Bucket. 1.0 is perfect fit, 0.0 is no fit.
3. Sequence scores are used to enforce repetition and other ordering rules. A sequence score of −1.0 or lower is used to make a track ineligible for play.
4. Noise is added to the combined score. Noise is a random value between +/−MaxNoise/2.0. MaxNoise is a tunable system parameter, and represents the significance of score deltas. That is, a track that scores MaxNoise better than another track will always be selected ahead of the other track. However, tracks that score within MaxNoise of each other may be selected in either order (with a probability determined by the delta and the random distribution).

Detailed Inventory Management Processing

As described herein, Inventory Management processing concerns the implementation of the Add Track, Save, and Ban processing states shown in the state diagrams. In certain embodiments, Effective Inventory Management may be crucial to optimal operation, particularly with lower storage capacity devices. It may be less of an issue for higher capacity devices with large amounts of storage. However, limitations on the amount of content that may be cached (for example, as dictated by record label agreements) may make inventory management important for all device sizes.

Figure 20:
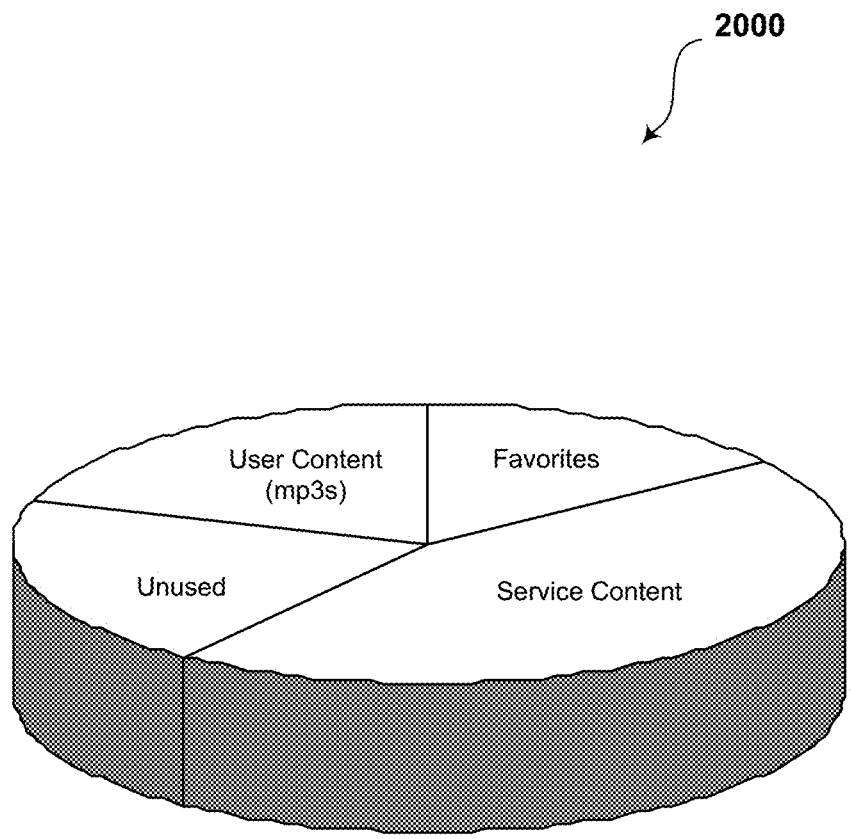
FIG. 20 illustrates an allocation of inventory pools for media content storage for an embodiment of the present invention.

The goal of inventory management is to optimize the storage utilization of the device for the stations in use. FIG. 20 illustrates a chart 2000 of Inventory Pools for a representative embodiment. As shown in FIG. 20, device inventory can be categorized as follows:

Service Content is the storage pool for files added by the service through either the unidirectional or bidirectional links.

'Favorites' is the storage pool for files from the service that have been 'saved' by the user.

User Content is the storage pool dedicated to storing files explicitly transferred to the device from the user's personal collection, such as user owned MP3 or other media files.

Unused is the unused storage available on the device.

Managing Service Content Inventory Concepts

In typical embodiments, Favorites and User Content are considered separate storage pools, because once the user saves a favorite or loads their own content the storage is deemed largely untouchable. That is, only the user can free this storage by explicitly removing items. The Service Content pool, on the other hand, is dedicated to providing the best possible enhanced radio experience and must optimize its use of storage autonomously. Basic concepts behind the managing of the service inventory are as follows:

1. The service storage pool will grow to the capacity of the device (for smaller capacity devices) or a fixed upper limit (for larger capacity devices).
2. Add Track processing from the connections fills the pool towards its upper limit (high water).
3. When enough tracks have been added to reach Inventory "high water" the worst tracks can be removed until inventory "low water" is reached.

Add Tracks Processing

Figure 21:
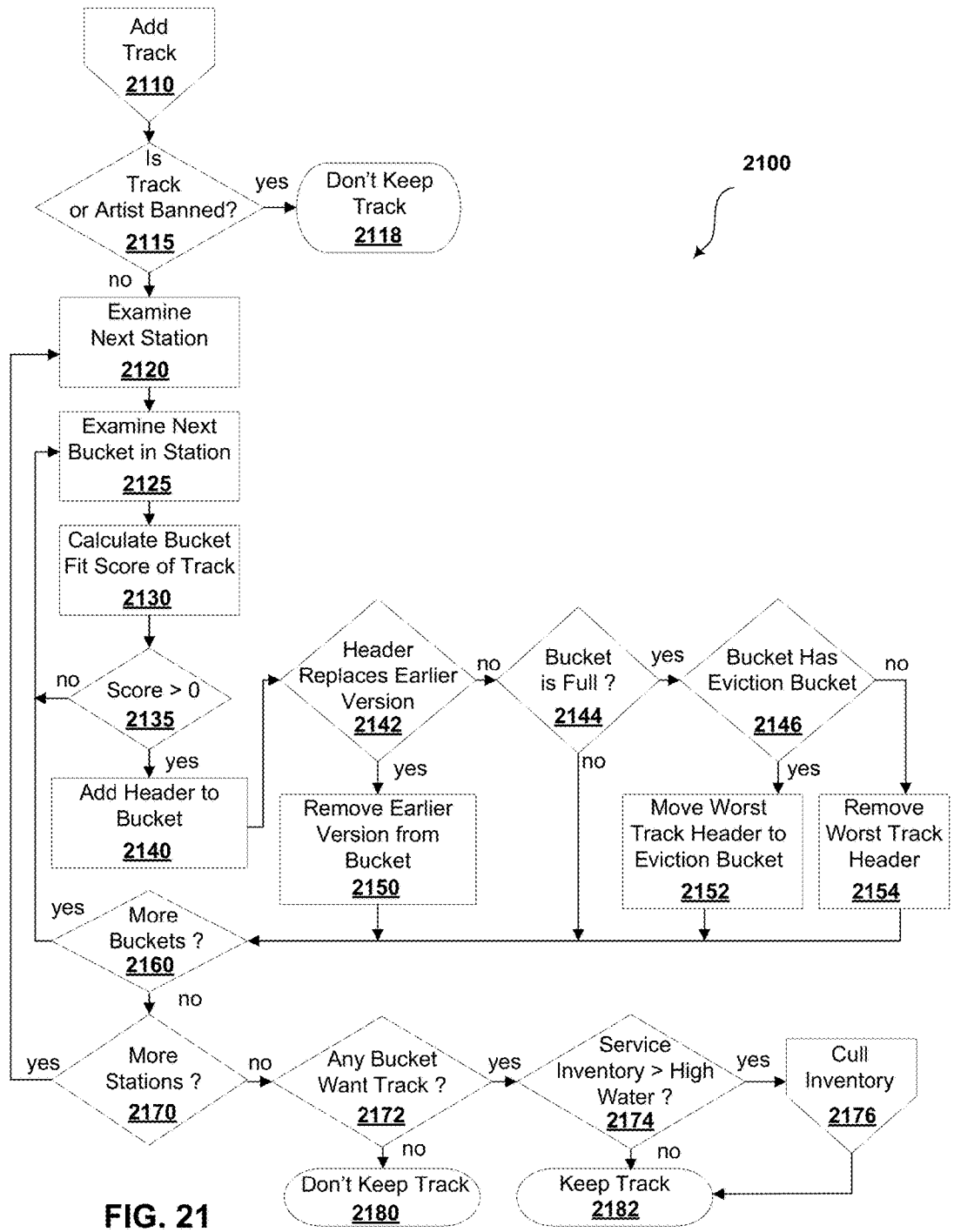
FIG. 21 is a flowchart showing an embodiment of an add track process in accordance with aspects of the present invention.

Attention is now directed to FIG. 21, which is a flowchart 2100 depicting an embodiment of an Add Tracks process in accordance with aspects of the invention. In summary, an incoming track is 'offered' to each station on the device, which in turn offers the track to each of its buckets. If the station is programmed using only SongBuckets, it may be possible to route the track directly to the station/buckets to which the track is targeted as an optimization. Stations that contain RuleBuckets must score the track against their rules to determine if the track fits or not. In a typical embodiment, there are 3 possible results of offering a track to a Bucket:

1. The Bucket does not want the track
   a. The Bucket already has this exact same track
   b. The track does not meet the Bucket's criteria
2. The Bucket has added the track (growing in size to do so).
3. The Bucket has added the track by replacing one of its existing tracks:
   a. The Bucket replaced an older version of the same track
   b. The Bucket replaced a different track with this track If some Bucket on some station adds the incoming track, the media file may then be stored on the device. If no Bucket on any station adds the track, the media file is discarded. In a typical embodiment, the device monitors available storage space using a high and low water mark model. Once storage usage reaches the high water mark, an operation to cull inventory is undertaken to bring storage utilization back down to the low water mark.

Eviction

HeavyRotation buckets typically contain the most popular and frequently played songs on standard stations. The bucket has a fixed maximum size that, combined with the significant station duty cycle, may yield a fairly high rate of individual song repetition. When new tracks are received into a full HeavyRotation bucket, old tracks must be removed from the bucket to make room for the newer tracks. Since the displaced track is still potentially very valuable to the station, the station can be programmed to allow tracks 'evicted' from one bucket to be automatically assigned to a new bucket. If no eviction bucket is specified, the evicted track is removed (providing no other stations hold references).

In more detail, process 2100 may begin with an add track start stage 2110 based on reception of a new track. Execution may then proceed to a banned selection stage 2115 where an assessment is made as to whether the particular track or artist has been banned. If the track or artist has been banned, execution of the process is terminated at stage 2118 with the track being discarded. If the track or artist is not banned, a station may next be selected for examination at stage 2120, with the next available bucket examined at stage 2125. The bucket fit score of the track may be examined at stage 2130, and the score tested at stage 2135. If the score is less than zero, execution returns to the next bucket stage 2125. Alternately, if the score is greater than zero the track header may be added to the bucket at stage 2140, and tested to see if it replaces an earlier version of the header at stage 2142.

If there is an earlier version in the bucket, it will be removed at stage 2150 with execution proceeding to stage 2160. If not, the bucket may be tested for fullness at stage 2144 and, if full, execution proceeds to stage 2160. Finally, at stage 2146 if the bucket is not full and the bucket has an eviction bucket, the worst track header will be moved to the eviction bucket at stage 2152, with execution returned to stage 2160. If there is no eviction bucket execution proceeds from stage 2146 to stage 2154, where the worst track header is removed and execution proceeds to stage 2160.

Figure 22:
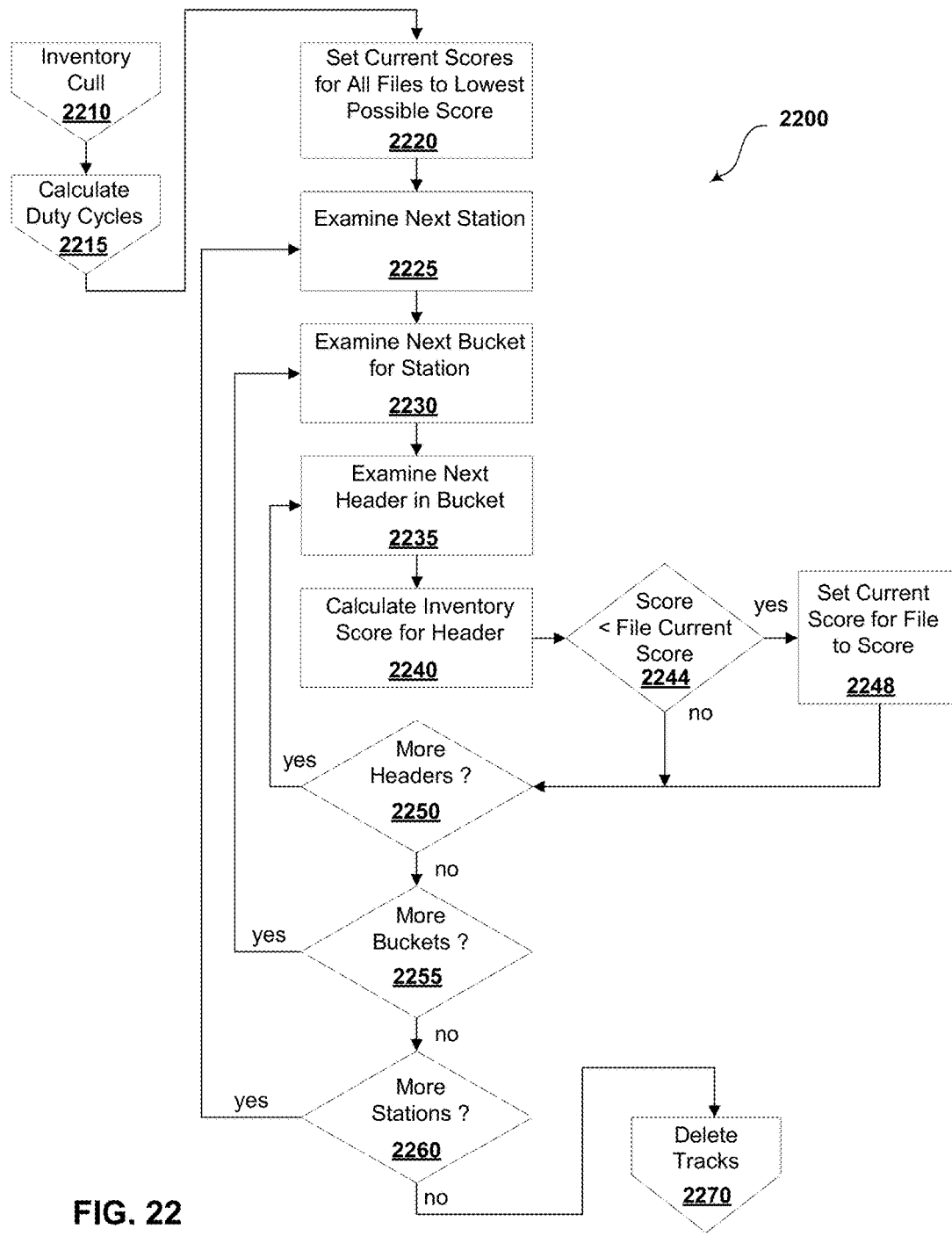
FIG. 22 is a flowchart showing an embodiment of an inventory cull process in accordance with aspects of the present invention.

At this point, a test is made at stage 2160 to determine if more buckets need to be tested. If so, execution proceeds to stage 2125. If no more buckets need to be tested for the current station, a test is made at stage 2170 to determine if additional stations need to be tested. If so, execution returns to stage 2120 to test the next station. Alternately, a test is made at stage 2172 to determine if any bucket wants the track and if not, the track is discarded at stage 2180. At stage 2173 a test is performed to determine if the service inventory has exceeded the capacity (or high water mark). If it has, the inventory may be culled at stage 2176 (an implementation of a cull inventory stage is further shown starting at stage 2210 as shown in FIG. 22). If capacity (i.e. high water) has not been exceeded, the track will be kept/added to inventory at stage 2182.

Inventory Culling

Attention is now directed to FIG. 22, which is a flowchart 2200 depicting one embodiment of an Inventory Culling process in accordance with aspects of the invention. In accordance with this embodiment, once the service pool reaches high water, an inventory culling process may be employed to remove the 'worst' tracks and bring the inventory levels down to a desired 'low water' mark. This process may be used to aid in ensuring that there is always free storage to handle the next 'Add Track' event. Other reallocation of device storage may also be implemented through Inventory Culling. For example, to free up space for additional user content to be transferred onto the device, the service pool allocation may be adjusted by changing the high and low water marks. Inventory culling then removes the tracks to free up the required space. Other operational situations may also employ the inventory culling process.

In summary, in process 2200 a scan traverses all stations and buckets and scores each track based on an estimate of the eventual order of playback. If a track appears in more than one bucket, the largest of its scores may be assigned to the track. Note that since the score indicates the predicted next time the track will play, it is possible to manage inventory by removing all tracks with a score greater than a calculated threshold. The calculation should take into account the repetition of tracks in HeavyRotation buckets as well as tracks that appear in multiple buckets. This approach may be slightly more efficient (i.e. a heap is not required), but is less flexible in regard to the scoring algorithm.

Figure 24:
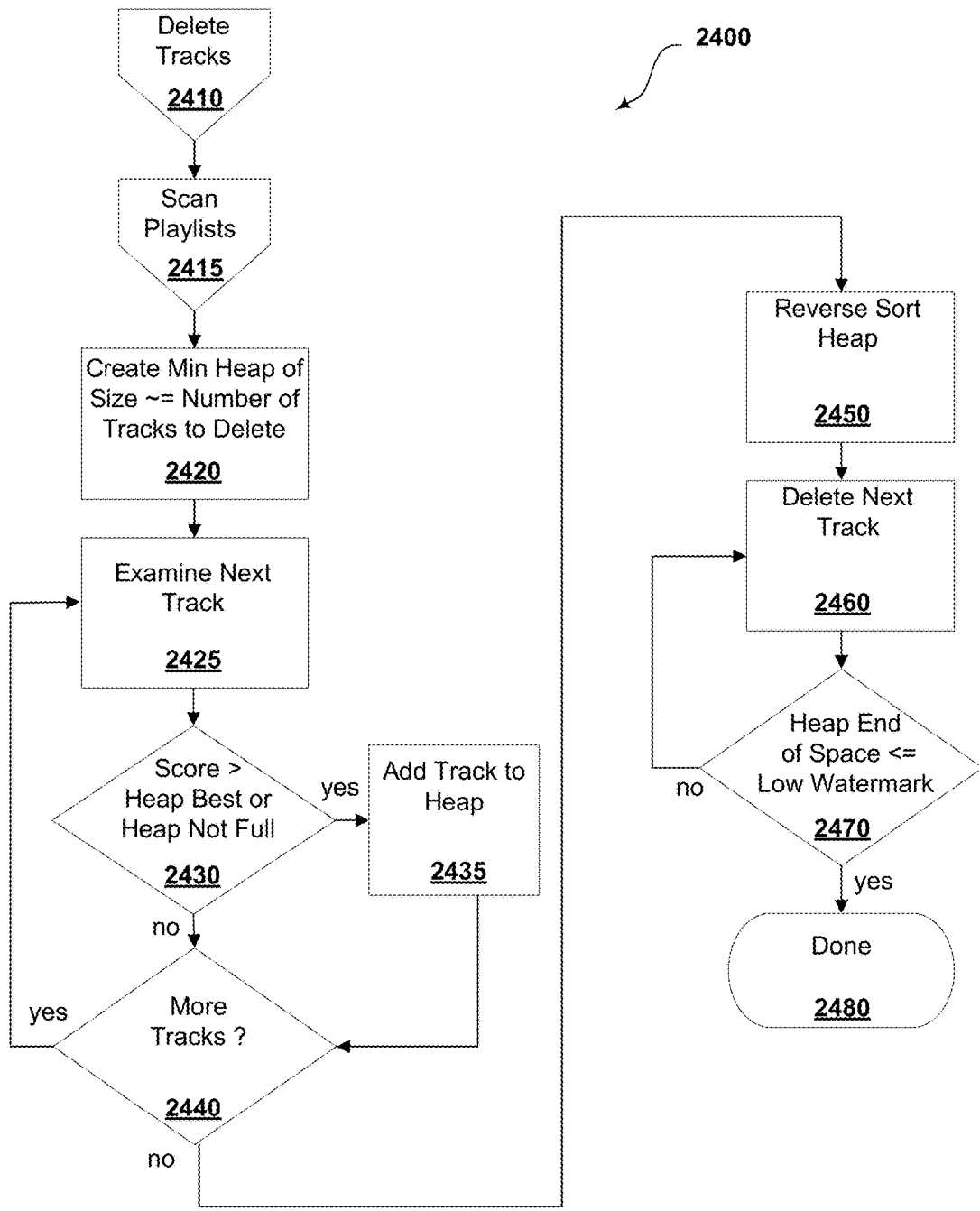
FIG. 24 is a flowchart showing an embodiment of a delete tracks process in accordance with aspects of the present invention.

Process 2200 is further described below, with additional details related to specific aspects further described following the overall process description. The process may begin at an inventory cull start stage 2210, with execution proceeding to a calculate duty cycles stage 2215. The current score for all files may initially be set at the lowest possible score at stage 2220, with each station successively examined, starting at stage 2225. For each station the buckets in the station are examined at stage 2230, with the headers in the examined bucket examined at stage 2235. The inventory score for the header being examined is determined at stage 2240. If the determined score is greater than the file's current score, the current score is assigned to the file at stage 2248. If not (i.e. if the current is less than or equal to the file current score) the file current score is retained with execution proceeding to stage 2250. Each header within the bucket are then examined based on a test at stage 2250, each bucket in the station are examined based on the test at stage 2255, and each station is examined based on a test at stage 2260. Once all stations and their respective buckets and headers have been tested, based on reaching the end of the stations at stage 2260, a delete tracks stage 2270 (an implementation of this stage is further shown starting at stage 2410 as shown in FIG. 24) may then be employed.

Additional details of aspects of inventory management are further described below.

Scoring Tracks for Deletion

As noted above, in a typical embodiment, the overall strategy for Inventory Management is to rank each track according to its likely order of playback on the device. The tracks that are more likely to be played sooner are kept and the tracks that are likely to be played later are deleted. To score tracks, each track may be ranked in a bucket according to its probable play order within that bucket. Duty cycle is then accounted for with respect to both the bucket within the station and the station within the player to achieve a score that ranks all tracks within the device. The worst tracks can then be deleted until inventory levels are within a desired range. In an exemplary embodiment, the first step in this process is to calculate a forward-looking duty cycle for each station.

Calculating Station Duty Cycles

The available inventory for the device may be managed according to the predicted "duty cycle" for each station. Duty cycle for a station represents the percentage of total device plays attributed to the station. A goal is to calculate a forward-looking duty cycle for each station. The forward-looking duty cycle must adapt to changing patterns of usage. For example, if a user starts listening to a new station, the forward looking duty cycle for that station should increase upwards even if the actual duty cycle of the station over the life of the device is quite low. Put another way, the duty cycle should be adapted based on a weighted average of recent and longer term observations; simply measuring the long term observed duty cycles of each station creates a system that fails to adapt quickly to new patterns, whereas a system based entirely on short-term observations neglects the information provided by the device's longer term history.

In an exemplary embodiment, an adaptive strategy that varies the rate of adaptation based on the delta between short term and longer-term observations is employed. The goal is for the duty-cycle of a new station to increase relatively rapidly based on short-term observations, at the same time taking into consideration an extended number of observations to completely overcome the longer-term usage patterns of the device. In addition, a tunable constant may be required to allow the rate of adaptation to be controlled.

One such approach is to use an exponential decay function on the delta between the short-term and long-term observations. As noted previously, exponential decay is a function where the rate of decay of a quantity is proportional to the amount of the quantity remaining. For a quantity N and decay constant λ we have:

$$\frac{dN}{dt} = -\lambda N$$

Integrating produces the generalized function for exponential decay at time t where No is the initial quantity.

$$N(t) = N_0 e^{-\lambda t}$$

Applying this technique to short and long term duty cycles we have $$c_{t+1} = (o_{t+1} - c_t)\lambda + c_t$$

Where $c_{t+1}$ is the adapted duty cycle at time t+1, $o_{t+1}$ is the observed duty cycle at time t+1 and $c_t$ is the adapted duty cycle at time t.

Figure 23:
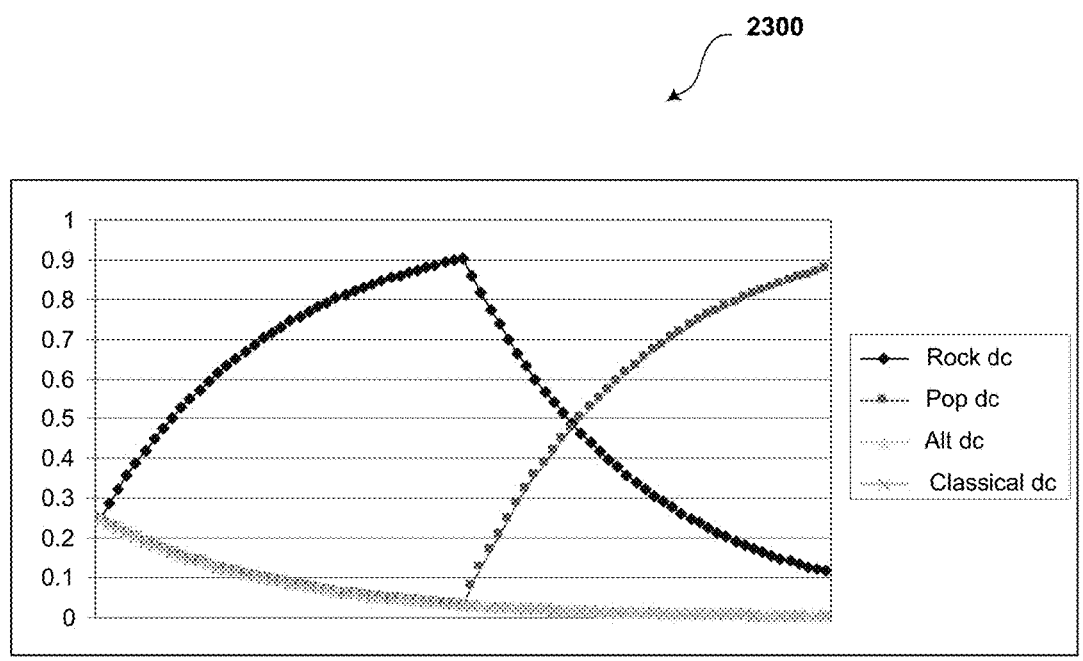
FIG. 23 is a graph of duty cycle adaptation for various types of stations based on an embodiment of the present invention.

FIG. 23 shows a graph 2300 illustrating the general shape of the duty cycle adaptation starting with 4 equally played stations. At t0 (start time), the Rock station begins getting 100% of observed play events. Halfway through the displayed time interval, the Pop station begins getting 100% of observed play events. The value of λ chosen (here it is 0.05) controls the rate of adaptation.

Duty Cycle Renormalization

While short-term observations may provide a good predictor of future duty cycle, it may also be desirable to ensure that any station supported by the device is playable with a minimum allocation of inventory. To achieve this without disrupting the overall strategy of using duty cycle as the guide to inventory allocation, a minimum "baseline" duty cycle floor for all stations in the device may be set. The baseline duty cycle ensures that inactive stations get at least $T_{s\ min}$ tracks where $T_{total}$ represents the total number of tracks in the service.

$$c_{baseline} = T_{s\ min} / T_{total}$$

To calculate the "normalized" duty cycles for active stations (those with predicted duty cycles >0), the calculation is started by allocating a duty cycle of $c_{baseline}$ to all stations (active and inactive). The residual duty cycle available for allocation to the active stations is then:

$$c_{residual} = 1.0 - (c_{baseline} n_{stations})$$

Then, the residual duty cycle may be allocated to the active stations in proportion to the predicted duty cycle of each station:

$$c'_i = c_{baseline} + (c_i \cdot c_{residual})$$

A cap $T_{s\ max}$ on the number of tracks in a station may also be established, beyond which the extra inventory for a station provides negligible benefit. After ensuring that the duty cycle accounts for baseline inventory for all stations, we can re-apportion the excess from stations that exceed the cap. The duty cycle cap for any station is:

$$c_{max} = T_{s\ max} / T_{total}$$

The duty cycle may be set to $c_{max}$ for any station with a duty cycle greater than $c_{max}$. For $u_0 \ldots u_{m-1}$ representing the duty cycles below the cap we have:

$$u'_i = u_i + (c_{max}/m)$$

That is, the inventory excess is distributed equally among the m stations that are below the cap. The rationale is that additional inventory will have a larger positive impact on smaller stations (the reason for a cap), but these stations have less likelihood of being played. It may be assumed that factors cancel, therefore opt for an even reallocation. This technique can result in duty cycles greater than $c_{max}$; a station just below $c_{max}$ gets an allocation of excess inventory that could push it over $c_{max}$.

Ranking of Tracks in Buckets

As described above, it may be preferable that each Bucket ranks its tracks in the likely order that the tracks will be played as part of the inventory management process. By convention, algorithms used for ranking the tracks versus the bucket vary based on the bucket type.

Heavy Rotation Buckets

HeavyRotation Buckets are buckets of fixed maximum size to achieve a desirable repetition rate. HeavyRotation buckets may be ranked for inventory management by fit/slider score first and secondarily by programming date. Because HeavyRotation buckets are small in comparison to their duty cycle, they tend to stay mostly in inventory.

Library Buckets and Medium Rotation Buckets

For larger buckets (>10 tracks, target rest >100), the sequence score becomes more important in determining the value of the track to the bucket. However, there is a tradeoff between bucket fit and the sequence penalty associated with repetition.

Slider settings dynamically affect this relationship. A distinction can be made between saved/locked slider settings and those used to temporarily tweak playback order. In the former case, the station is desirably optimized for the particular slider settings by favoring inventory that matches the sliders. In the latter case, the slider settings apply to playback only, and do not affect the ranking of tracks within the bucket for inventory purposes. In the latter case we assume the sliders may well be in a different position in the future, so they are irrelevant for ranking deep into the bucket.

For locked sliders, a combination of slider score and bucket fit score (for RuleBuckets) may be used to determine the fit component of the inventory score:

For RuleBuckets:

InventoryScore=((FitScore+SliderScore)/2)+InventorySequenceScore

For SongBuckets:

InventoryScore=SliderScore+InventorySequenceScore

The calculation of a sequence score may be based on estimating what the sequence score might be when the track is played. In an exemplary embodiment, the sequence penalty associated with a track in relationship to the fit score may be discounted. The same sequence scoring algorithms that are used for playback may be used, but they can be calculated for a future time/track interval. Here t' represents the number of tracks into the future to calculate the sequence penalty. Nbucket is the number of tracks in the bucket.

$$t' = \frac{(n_{bucket}/2)}{(c_{bucket} \cdot c_{station})}$$

For time-based rules (e.g., rules resulting from the requirements of the DMCA concerning the maximum number of times tracks for a given artist can be played in a given time period), t' can be multiplied by average track length. The inventory sequence score is then calculated at t':

InventorySequenceScore=sequenceScore(t')

The sequence score should have a maximum value of slightly less than zero for tracks that have been played, but are well rested, and a uniform value of 0.0 for tracks that have not been played.

As an example, the sequence score for a track that has recently been played will be a large negative number as a consequence of the minimum and target rest factors discussed above. If in this example the value of t' is "40,"

minimum rest is "30" and target rest is "50," the discounted sequence score will be between −1.0 and 0.0 according to the applicable equations set forth previously. The actual scores are −55.7 after being played (rest=1), and −0.25 with the t' discount.

Calculating the Score

The bucket rank may then be combined with bucket duty cycle and station duty cycle to obtain a score that represents an estimate of an overall track playback order for the device. If r represents the rank of the track in the bucket (1 . . . n), let $c_{station}$ represent the predicted duty cycle of the station as described above, and let $c_{bucket}$ represent the duty cycle of the bucket with respect to the station, that is, the number of times the bucket appears in the clock divided by the number of slots in the clock, this results in:

$$score=(r-0.5)/(c_{station} \cdot c_{bucket})$$

Deleting Tracks

Attention is now directed to FIG. 24, which is a flowchart 2400 depicting one embodiment of a Track Deletion process in accordance with aspects of the invention. In general, after execution of an inventory cull pass through the stations (such as was previously described), the "worst" tracks are deleted from the device to free up storage space. In order to implement this, a process scanning all the files and their scores to accumulate a list of the at least N worst tracks, where:

$$N*averageTrackSize>currentInventorySize-lowWatermarkSize$$

may be done. Since tracks may be scored by estimated play order, by convention lower scores are better and higher scores are worse.

In an exemplary embodiment, a Min-Heap is used to efficiently accumulate the worst tracks. The process deletes each of the files in the Heap in worst to best order until the desired low water mark is achieved. Note that since the score indicates the predicted next time the track will play, inventory can conceivably be managed by removing all tracks with a score greater than a calculated threshold. The calculation must take into account the repetition of tracks in HeavyRotation buckets as well as tracks that appear in multiple buckets. This method may be slightly more efficient (i.e. a heap is not required), but is less flexible in regard to the scoring algorithm. In the described embodiment, this process may also be used to delete tracks that are no longer referenced by stations or playlists. As described previously, by convention a file will have a "worst possible" score from the initialization phase if it is not referenced by any station.

Figure 25:
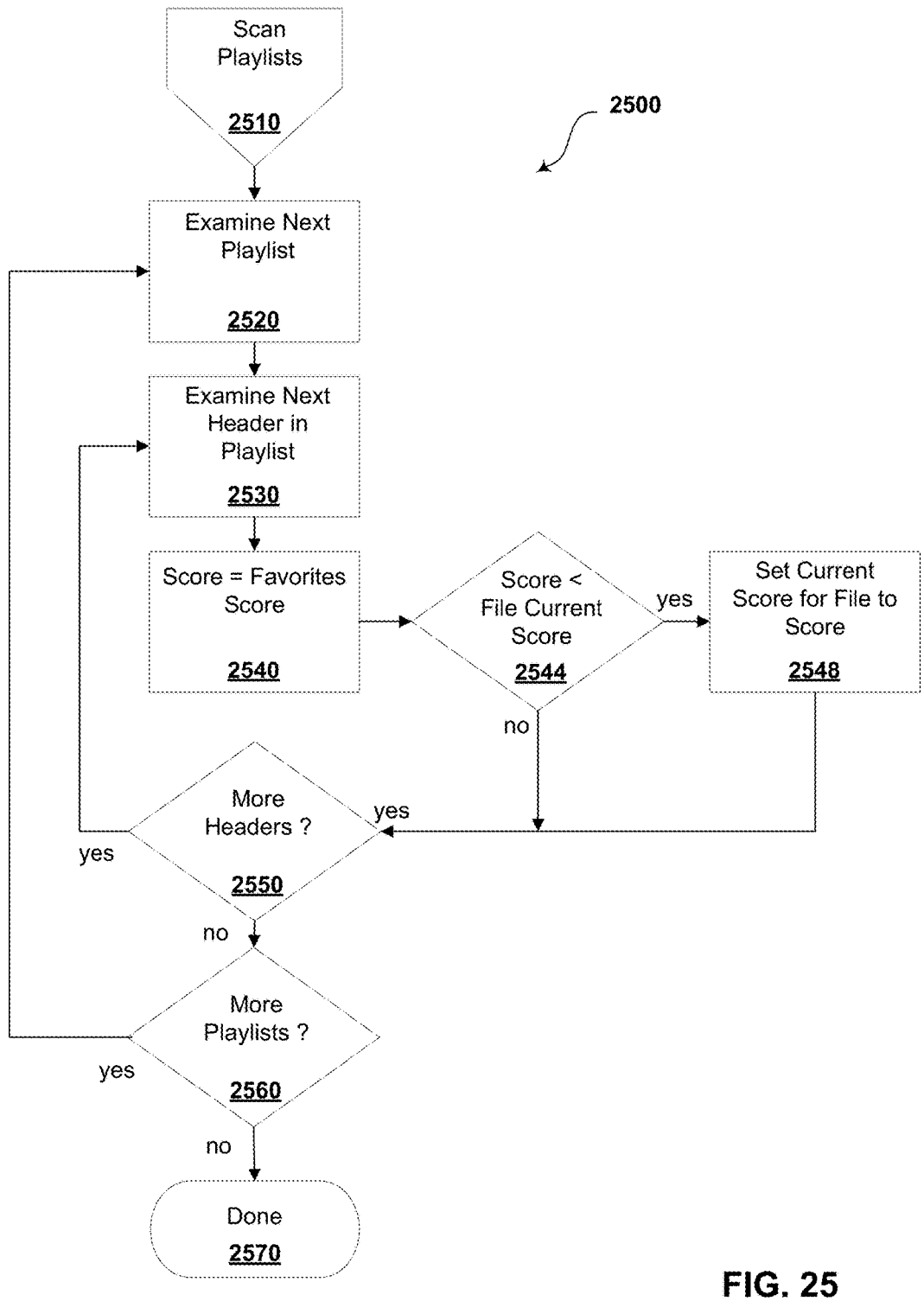
FIG. 25 is a flowchart showing an embodiment of a scan playlists process in accordance with aspects of the present invention.

More particularly, the track deletion process 2400 illustrated in FIG. 24 may first begin at a start stage 2410, with execution proceeding to a scan playlists stage 2415 (details of an embodiment of a scan playlists stage are further illustrated starting at stage 2510 as shown in FIG. 25). A Min Heap sized at approximately the number of tracks to delete may be created at stage 2420. Examination of tracks begins at stage 2425. If the score is greater than the Heap Best Score, or the Heap is not full, the track may be added to the Heap at stage 2435, with execution proceeding to stage 2440. Alternately, the track is not added and execution likewise proceeds to stage 2440 where a test is made of whether additional tracks need to be tested. If they do, execution returns to stage 2425 for examination and testing of additional tracks. If no tracks remain to be tested at stage 2440, execution proceeds to stage 2450 where the heap is reverse sorted. A loop is then performed where the next track is deleted at stage 2460, the heap end of space is tested against the low water mark, and if it is greater than or equal to the low water mark execution returns to stage 2460 where an additional track is deleted and the process repeated. Once the heap end of space is below the low water mark the process may be completed at stage 2480.

If the user interface of a particular embodiment supports adding tracks from the service to user defined playlists, an additional pass is required to score the tracks that are referenced by playlists, but no longer referenced by stations. Each of these tracks can be given a "best possible" score to ensure that they are not removed.

An embodiment 2500 of a Scan Playlist process is illustrated by the flowchart of FIG. 25. The process of scanning files may begin with a scan playlists start stage 2510, with execution proceeding to a successive looped examination of playlists at stage 2520 and associated headers at stage 2530. A Score is assigned initially to the file at stage 2540 equal to the favorites score. The Score is tested at stage 2544 to determine if it exceeds the File Current Score. If it does, the Current Score is set to Score at stage 2548 and execution is transferred to stage 2550. If Score does not exceed the File Current Score at stage 2544, execution is transferred to stage 2550 without any further action. Once execution of the loops of stage 2550 and 2560 are finished the process may be completed at stage 2570.

Saving Favorites Processing

Figure 26:
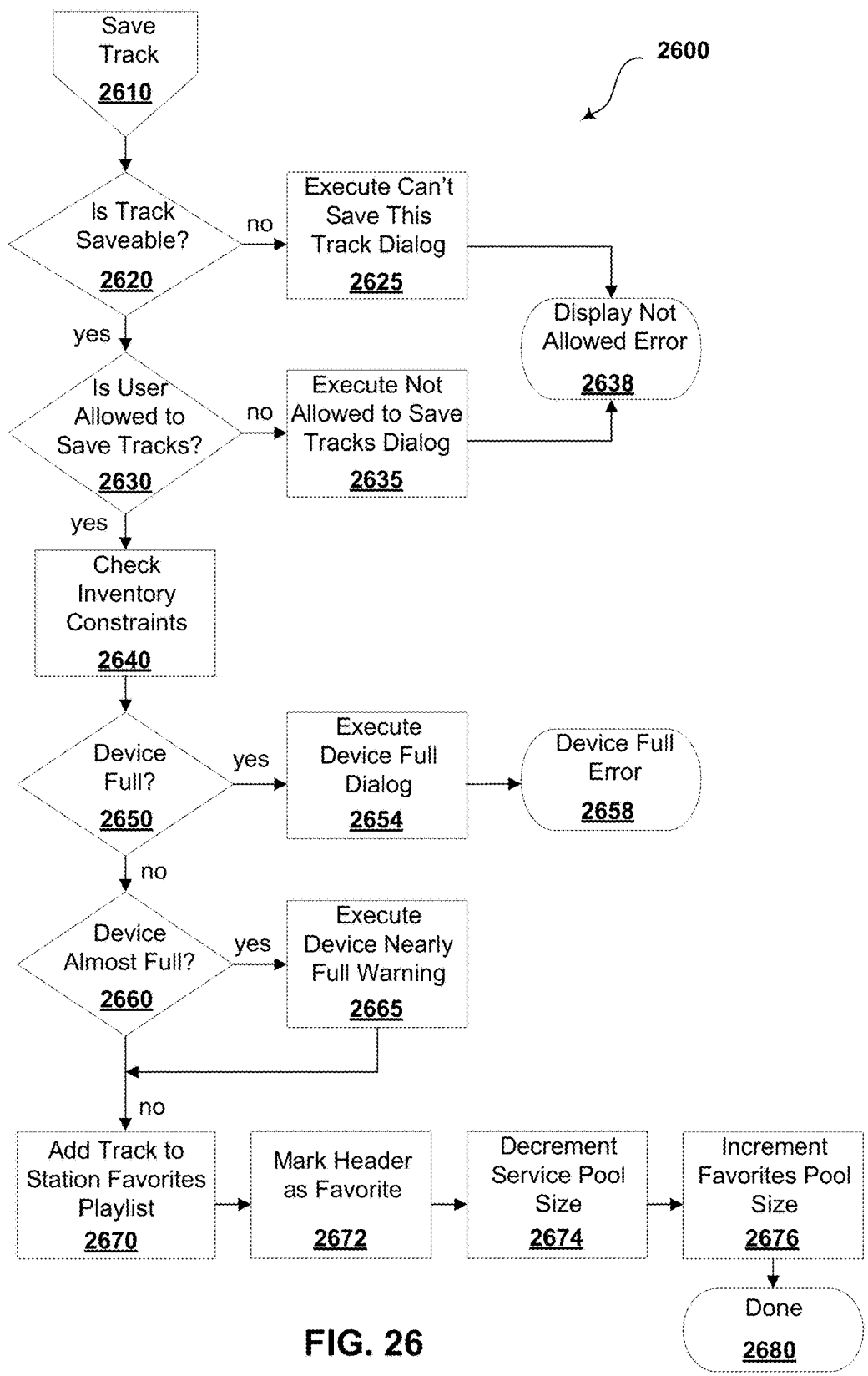
FIG. 26 is a flowchart showing an embodiment of a save tracks process in accordance with aspects of the present invention.

Attention is now directed to FIG. 26, which shows a flowchart 2600 illustrating a Saving Favorites process consistent with aspects of the invention. In a typical embodiment, the operation of saving favorites or adding tracks from the service into user-defined playlists essentially moves the track from one storage pool to another. Although these tracks are still part of the station inventory and still contribute to the station, this distinction is made because the tracks are protected so that they can no longer be removed from the system without the user explicitly doing so. Removal of a track from the service inventory pool can be thought of as essentially removing a re-usable slot. Constraints should be checked and enforced to ensure that the service cannot be substantially degraded by saving favorites.

As shown in FIG. 26, a save track (saving favorites) process may begin with a start stage 2610. This may be initiated by, for example, a user input based on a desire to save the track. The track may then be tested at stage 2620 to determine whether it is savable. If it is not, a can't save dialog may be executed at stage 2625, along with a display not allowed error or other indication provided at stage 2638. Assuming a track is savable, it may then be tested at stage 2630 to determine if the user is allowed to save the track. If not, a similar series of not allowed and error displays may be executed at stages 2635 and 2638 respectively. Assuming the track is not prohibited from saving, inventory constraints may be checked/determined at stage 2640 (details of inventory constraints checking are further described and illustrated below with respect to FIG. 27). Based on this information, device fullness may be tested at stage 2560. If the device is full, dialog stage 2654 and error stage 2658 may be executed. If, instead, the device is not full but close to capacity as determined by device almost full stage 2660, a device nearly full warning stage 2665 may be executed. Finally, if the device has sufficient capacity for storage, the track may be added to the station favorites playlist at stage 2670, the header may be marked as a favorite at stage 2672, the service pool size may be decremented accordingly at stage 2674, the favorites pool size may be incremented at stage 2676, and the save track process completed at stage 2680.

Checking Inventory Constraints

Checking inventory constraints is the process of determining if there is enough space left in the service to accommodate a reallocation of storage. In typical embodiments, the minimum space required to operate the service may be defined in terms of a few tunable and derived parameters as set forth in FIG. 27. In general, the service inventory constraint is defined in terms of the constant $A_{min}$: the minimum number of tracks needed to support the active stations. Since users divide their listening time between one or more stations, $A_{min}$ could be described as the number of tracks needed to support a single station that gets 100% of the listening time.

In addition to tracks for the active stations, the service pool needs to reserve a minimum number of tracks for each inactive station that renders the station listenable as it transitions from an inactive station to an active station. This constant is denoted as $T_{s\ min}$. Thus the minimum size of the services pool is:

$$T_{min} = A_{min} + (T_{s\ min} * \text{inactive stations})$$

However, this is the minimum size of the services pool at low water. Space should also be reserved to account for the difference between low water and high water.
Thus the device is full when $$T_{total} - T_{float} \leq T_{min}$$

A device full warning message may be issued when the device approaches this threshold:

$$T_{Total} - T_{float} \leq T_{min} + T_{warn}$$

As noted above, when saving favorites or saving service tracks into user defined playlists, the service pool is decremented by one track. Therefore, the above constraints for $T_{total} - 1$ should be checked before allowing the operation.

Shrinking the Services Pool

In a typical embodiment, the services pool is designed to grow to the device capacity or some preconfigured maximum for large capacity devices. To free excess services storage for other purposes, the high and low water marks may be adjusted, and an inventory cull may be performed. To free N bytes of space:

$$W'_{low} = W_{low} - N$$

The number of tracks removed is approximately:

$$(W_{low} - W'_{low})/t_{size}$$

The operation can be allowed if:

$$T_{total} - T_{flout} - ((W_{low} - W'_{low})/t_{size}) \geq T_{min}$$

Banning Tracks Processing

Figure 28:
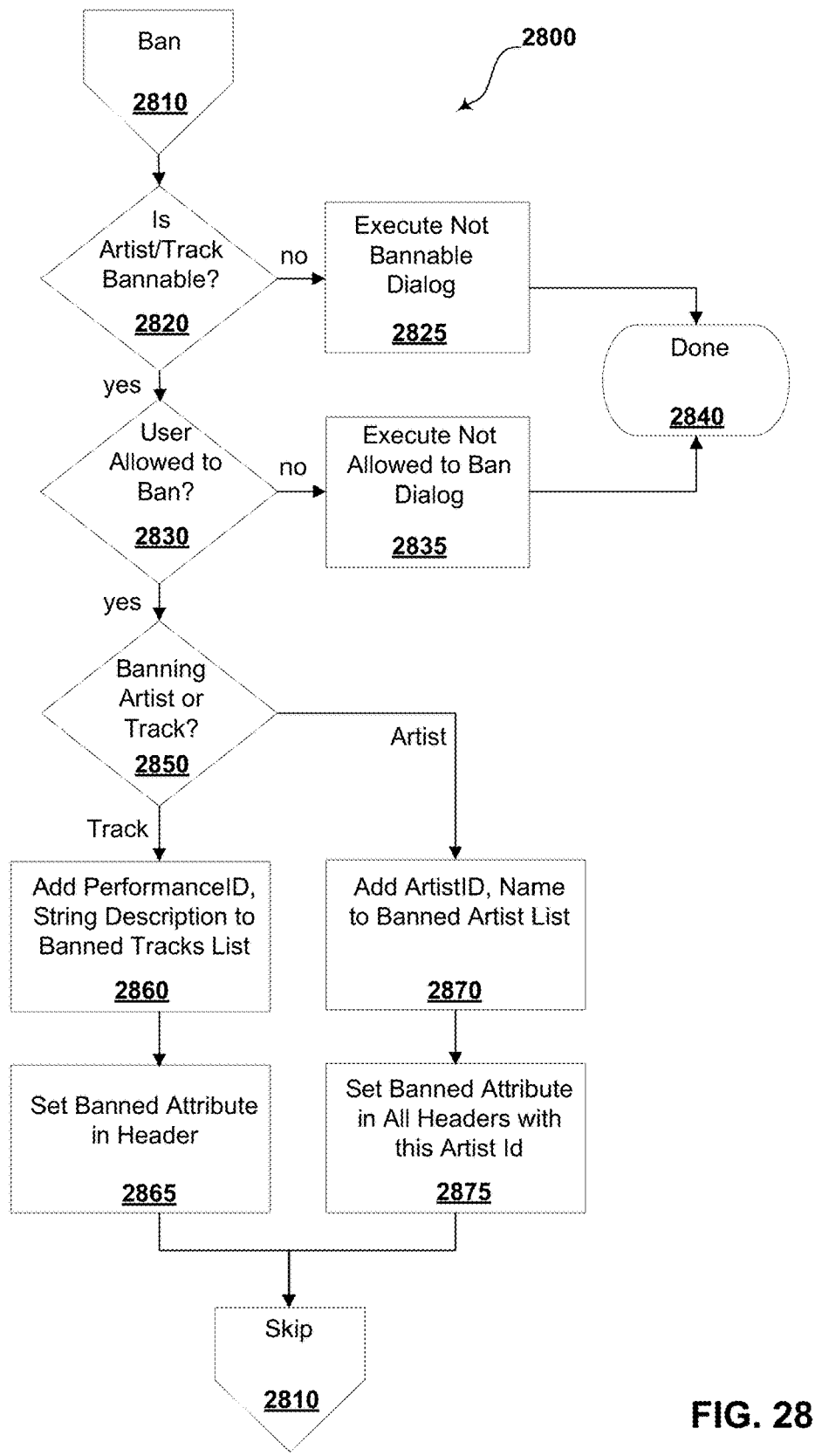
FIG. 28 is a flowchart showing an embodiment of a ban tracks process in accordance with aspects of the present invention.

Referring now to FIG. 28, a flowchart 2800 of an embodiment of a Ban Tracks process consistent with aspects of the invention is shown. In typical embodiments banning of tracks or artists is accomplished by marking the Headers of the tracks as being banned. In addition, the banned track may be added to a Banned Track List and the banned artist may be added to a Banned Artist List.

As shown in FIG. 28, a ban track process may begin at a start stage 2810, with execution proceeding to a test stage 2820 where artist/track ban-ability is tested. If the artist or track is not ban-able, a not ban-able dialog stage 2825 may be executed, followed by completion of the process at stage 2840. Likewise, a test may be applied at stage 2830 to determine whether the user is allowed to ban the particular track. If not, a similar not allowed dialog stage 2835 may be executed, and the process completed at stage 2840. Alternately, if the track or artist is ban-able, a test of track or artist ban may be done at stage 2850 (to determine whether ban applies to the single track or all of the artist's tracks). As a consequence, the track/artist may be added to a banned track/artist list at stages 2860 or 2870 respectively, and the banned attribute set in the track header or all headers with the artistID at stages 2865 or 2875 respectively. Finally, a skip stage 2810, such as was described previously starting with stage 1110 of FIG. 11, may be executed.

In alternate embodiments, banning based on other criteria can be implemented in a similar or analogous fashion. Tracks that are marked as banned may be given 'worst possible' rankings in their buckets when scoring tracks for inventory culling, and thus will be deleted on the next inventory cull cycle.

The banned lists may also be consulted for other functions, such as when an incoming track is received so that banned artists or tracks are not re-added to device memory.

Updating Metadata

In typical embodiments, both bidirectional and unidirectional connections can provide updated metadata and media files for tracks. The connection may send metadata only (i.e. the Header) or may send an updated Header+Media File combination. While in future implementations it may be desirable to optimize the handling of Metadata updates, it is envisioned that the simplest way of handling Metadata updates is to process the updated Header with an Add Track process, such as process 2100 as illustrated in FIG. 21. Processing metadata updates via the Add Track process requires that all Buckets offered the Header scan their inventory for a reference to a previous version of the Header (as defined by having equivalent Performance Ids) even if they don't want the track. If the Bucket doesn't want the new version of the track, but holds a reference to the old version, the Bucket must remove the old version (possibly triggering the removal of the associated media file if this was the last reference). If the Bucket still wants the track, the old header must be replaced with the new one (if the media file is not updated, the new header must be pointed at the old media file; if the media file is updated, the old media file and header must be removed at the end of the update operation).

Adding New Stations

In typical embodiments, when the device is connected via a bidirectional connection the user will have the opportunity to add niche or custom stations that are only reasonable to populate across this connection type. When adding a new station, the inventory must be adjusted to accommodate the new station. The device must have room for at least an additional $T_{s\ min}$ tracks. If this is not the case, the user may be prompted to facilitate making room for additional stations by removing stations, favorites, or media files (i.e. mp3s, etc.).

In a typical embodiment a new station should receive a default initial duty cycle above and beyond the baseline, and predicted duty cycles should be re-calculated. (it is assumed that the user will listen to the newly added station). As tracks are added across the bidirectional connection and the high water mark is reached, inventory is freed according to the predicted duty cycles. See, for example, the process for culling inventory as is shown in process 2200 illustrated in FIG. 22.

Detailed Connections Processing

Adding Tracks from Unidirectional Connections

In typical embodiments, as tracks are received from a unidirectional connection (i.e. a broadcast type connection), they are added to inventory using Add Tracks processing as is, for example, described in process 2100 shown in FIG. 21.

Wireless (Bidirectional) Update

Station Refresh

In typical embodiments, when the device has a bidirectional connection to the broadcasting services/content management system, the device will attempt to obtain updates only for its active stations in priority order. Thus, the device can request targeted updates and utilize the connection only for tracks known to be of interest to the device. To obtain targeted updates, the device first re-calculates its predicted duty cycles as described above. The stations that have the largest negative delta between actual and predicted/allocated inventory are the first priority for update. The current inventory of the player relative to a station may be transmitted to the server along with the target inventory level for that station based on device capacity and predicted duty cycle. The server can then reply with an update to the station that may include the following information, as well as other information:

1. An updated Clock if the station definition has been changed on the server side.
2. Updated Headers for tracks currently on the device if metadata for those Headers has changed.
3. A list of additional tracks to download in priority order.

In response, the device processes the reply message by updating the station definition (if changed), and updating the Headers as indicated (see Updating Metadata above). The device then begins receiving/downloading each of the specified tracks in the order specified. Each track is 'added' to the player as if it where received on a unidirectional connection (this may be done to ensure that the player is consistent in the face of adds from both connection types, simplifies implementation, and handles the case where received tracks are targeted to multiple stations).

Rather than download all tracks to update a single station, it may be preferable for the device to get updates for its other active/high-priority stations and download the highest priority tracks across all the station updates to ensure that all active stations get some updates before the connection terminates. Should the connection persist, all stations will have the opportunity to process their updates.

Some aspects of the present invention may be embodied in the form or computer software and/or computer hardware/software combinations configured to implement one or more processes or functions of the present invention as described and illustrated herein. These embodiments may be in the form of modules implementing functionality in software, firmware, and/or hardware/software/firmware combinations. Embodiments may also take the form of a computer storage product with a computer-readable medium having computer code thereon for performing various computer-implemented operations, such as operations related to functionality as describe herein, on one or more computer processors. The media and computer code may be those specially designed and constructed for the purposes of the present invention, or they may be of the kind well known and available to those having skill in the computer software arts, or they may be a combination of both.

Examples of computer-readable media within the spirit and scope of the present invention include, but are not limited to: magnetic media such as hard disks, floppy disks, and magnetic tape; optical media such as CD-ROMs, DVDs and holographic devices; magneto-optical media; and hardware devices that are specially configured to store and execute program code and/or data, such as application-specific integrated circuits ("ASICs"), programmable logic devices ("PLDs") ROM and RAM devices, Flash devices, and the like. Examples of computer code may include machine code, such as produced by a compiler, and files containing higher-level code that are executed by a computer using an interpreter. Computer code may be comprised of one or more modules executing a particular process or processes to provide useful results, and the modules may communicate with one another via means known in the art. For example, some embodiments of the invention may be implemented using Java, C#, C++, or other programming languages and software development tools as are known in the art. Other embodiments of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method for facilitating personalized rendering sequences of media files on a wireless device configured with a wireless transmitter, a wireless receiver, a client cache and a user interface, the sequences of media files corresponding to a plurality of personalized content channels, the method comprising:

transmitting, using the wireless transmitter, a plurality of station profiles corresponding to the plurality of personalized content channels and current media file inventories for the plurality of personalized content channels, the current media file inventories and the plurality of station profiles being stored within the client cache;

receiving, from a server using the wireless receiver, a list of media files to be downloaded by the device wherein the list is generated based at least upon the current media file inventories;

requesting, from the server, ones of the media files on the list;

receiving, from the server over a-data link, the ones of the media files and associated file metadata, wherein the file metadata defines one or more attributes of the media files;

storing, in the client cache, the ones of the media files;

receiving, through the user interface, a user selection of a first selected one of the plurality of personalized content channels;

sequencing a first plurality of the media files for playback on a first of the plurality of personalized content channels based upon the one of the plurality of station profiles and the one of the current media file inventories associated with the first selected one of the plurality of personalized content channels;

receiving, through the user interface, a user selection of a second selected one of the plurality of personalized content channels; and sequencing a second plurality of the media files for playback on a second of the plurality of personalized content channels based upon the one of the plurality of station profiles and the one of the current media file inventories associated with the second selected one of the plurality of personalized content channels wherein the first plurality of media files is different from the second plurality of media files.

2. The method of claim 1 further comprising discarding, based upon the file metadata associated with said ones of the media files, one or more media files that are nonresponsive to the one or more station profiles;

categorizing the media files stored in the memory of the device into one or more categories;

wherein the sequencing the first plurality of the media files includes sequencing the first plurality of the media files for rendering responsive to the one or more categories.

3. The method of claim 2 wherein the media files selected responsive to the category are selected responsive to a measure to which the attributes of the media files match a set of attributes related to the category.

4. The method of claim 3 wherein the media files selected responsive to the category are additionally selected responsive to the degree to which the attributes of the media files match one or more attribute biases selectable by a user.

5. The method of claim 1 wherein sequencing for playback is responsive to a set of user preferences, said preferences including user identification of a user preference attribute of at least one of the media files as a favorite.

6. The method of claim 5 wherein said user preference attribute is further associated with an artist.

7. The method of claim 1 wherein the sequencing the first plurality of the media files for playback is responsive to a set of user preferences, said preferences including user identification of a user preference attribute of at least one of the media files as banned.

8. The method of claim 1 wherein the amount of storage devoted to local files associated with each of the plurality of personalized content channels is allocated responsive to the characteristics of the channel.

9. The method of claim 8 wherein the amount of storage devoted to the local files associated with each of the plurality of personalized content channels is allocated responsive to the characteristics of the categories associated with the channel.

10. The method of claim 1 further including updating the one of the plurality of station profiles in response to an attribute value specified by a user wherein the updating results in a change in a playback frequency on the first of the plurality of personalized content channels of ones of the media files classified by the first attribute value.

11. A method for managing inventory of media files on a wireless user device configured with a wireless transmitter and a wireless receiver, the method comprising:

transmitting, using the wireless transmitter, a plurality of station profiles corresponding to a plurality of personalized content channels and current media file inventories for the plurality of personalized content channels the current media file inventories and the plurality of station profiles being stored within a memory of the wireless user device;

receiving, from a server using the wireless receiver, a list of media files to be downloaded by the device wherein the list is generated based at least upon (i) a one of the plurality of station profiles corresponding to the at least one of the plurality of personalized content channels and (ii) the current media file inventories;

requesting, from the server, ones of the media files on the list;

receiving, at the user device, the ones of the media files on the list and associated metadata;

determining a value metric of each of the ones of the media files on the list, said determining based at least in part on said metadata;

selecting, based on said determining a value metric, sequences of the media files of said plurality of media files for playback; and rendering, at the device, the sequences of the media files wherein the sequences of the media files correspond to the plurality of personalized content channels.

12. The method of claim 11 further including updating the one of the plurality of station profiles in response to an attribute value specified by a user wherein the updating results in a change in a playback frequency on the at least one of the plurality of personalized content channels of ones of the media files classified by the first attribute value.

13. A method for sequencing media files for rendering on a wireless user device including a wireless transmitter and a wireless receiver, the method comprising:

transmitting, using the wireless transmitter, a current media file inventory for at least one of a plurality of personalized content channels;

receiving, from a server and using the wireless receiver, a list of media files to be downloaded by the device wherein the list is generated based at least upon (i) a one of a plurality of station profiles corresponding to the at least one of the plurality of personalized content channels and (ii) the current media file inventory, the current media file inventory and the plurality of station profiles being stored within a memory of the wireless user device;

requesting, from the server, ones of the media files on the list;

receiving the ones of the media files;

storing, in a memory of said device, the ones of media files and associated metadata;

retrieving, from said memory, said metadata associated with the ones of media files;

determining, for each retrieved metadata, a rendering value metric; and sequencing, based on said rendering value metric, ones of the media files for rendering as sequences of media files corresponding to the plurality of personalized content channels.

14. The method of claim 13 further including updating the one of the plurality of station profiles in response to an attribute value specified by a user wherein the updating results in a change in a playback frequency on the at least one of the plurality of personalized content channels of ones of the media files classified by the first attribute value.

* * * * *